(12) United States Patent  
Shinada et al.

(10) Patent No.: US 8,112,113 B2  
(45) Date of Patent: Feb. 7, 2012

(54) MOBILE TERMINAL

(75) Inventors: Yuki Shinada, Kawasaki (JP); Daisuke Nitta, Kawasaki (JP); Tetsuo Tomita, Kawasaki (JP); Tatsuru Nakagaki, Kawasaki (JP); Tomonori Kumagai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 64 days.

(21) Appl. No.: 12/580,610

(22) Filed: Oct. 16, 2009

(65) Prior Publication Data

US 2010/0035553 A1 Feb. 11, 2010

Related U.S. Application Data

(63) Continuation of application No. PCT/JP2007/058283, filed on Apr. 16, 2007.

(51) Int. Cl.  
*H04M 1/00* (2006.01)  
*H04B 15/00* (2006.01)

(52) U.S. Cl. .................. 455/552.1; 455/553.1; 370/328

(58) Field of Classification Search ............... 455/552.1, 455/553.1; 370/328  
See application file for complete search history.

(56) References Cited

U.S. PATENT DOCUMENTS

| | | |
|---|---|---|
| 6,223,030 B1 | 4/2001 | Van Den Heuvel et al. |
| 2003/0157932 A1 | 8/2003 | Chitrapu |
| 2003/0198200 A1 | 10/2003 | Diener et al. |
| 2003/0198304 A1 | 10/2003 | Sugar et al. |
| 2003/0210680 A1 | 11/2003 | Rao et al. |
| 2003/0224741 A1 | 12/2003 | Sugar et al. |
| 2004/0023674 A1 | 2/2004 | Miller |
| 2004/0028003 A1 | 2/2004 | Diener et al. |
| 2004/0028123 A1 | 2/2004 | Sugar et al. |
| 2004/0047324 A1 | 3/2004 | Diener |
| 2004/0102198 A1 | 5/2004 | Diener et al. |
| 2004/0137849 A1 | 7/2004 | Kloper et al. |
| 2004/0137915 A1 | 7/2004 | Diener et al. |
| 2004/0156440 A1 | 8/2004 | Sugar et al. |
| 2004/0171390 A1 | 9/2004 | Chitrapu |
| 2004/0203474 A1 | 10/2004 | Miller et al. |
| 2004/0203826 A1 | 10/2004 | Sugar et al. |
| 2004/0219885 A1 | 11/2004 | Sugar et al. |
| 2005/0002473 A1 | 1/2005 | Kloper et al. |

(Continued)

FOREIGN PATENT DOCUMENTS

JP 9-507986 8/1997

(Continued)

OTHER PUBLICATIONS

International Search Report dated Jul. 31, 2007, from the corresponding International Application.  
International Preliminary Report on Patentability and Written Opinion of the International Searching Authority dated Nov. 10, 2009, from the corresponding International Application.

*Primary Examiner* — Wen Huang  
(74) *Attorney, Agent, or Firm* — Katten Muchin Rosenman LLP

(57) ABSTRACT

A mobile terminal includes a reception unit to receive, from at least one of a plurality of communication systems, an initial beacon containing information for establishing communication according to each of the plurality of communication methods, a request unit to generate a request by use of the initial beacon to transmit the request to the at least one of the plurality of communication systems, and a determination unit to determine, based on information as a response to the request, the communication method and the frequency band, which are to be used in a time zone by the mobile terminal.

6 Claims, 49 Drawing Sheets

U.S. PATENT DOCUMENTS

| | | |
|---|---|---|
| 2005/0003828 A1 | 1/2005 | Sugar et al. |
| 2005/0032479 A1 | 2/2005 | Miller et al. |
| 2005/0073983 A1 | 4/2005 | Diener |
| 2005/0227625 A1 | 10/2005 | Diener |
| 2006/0063533 A1 | 3/2006 | Matoba et al. |
| 2006/0258347 A1 | 11/2006 | Chitrapu |
| 2006/0274684 A1 | 12/2006 | Diener |
| 2008/0019464 A1 | 1/2008 | Kloper et al. |
| 2008/0090563 A1 | 4/2008 | Chitrapu |
| 2008/0146269 A1* | 6/2008 | Pirzada et al. ............ 455/552.1 |
| 2009/0046625 A1 | 2/2009 | Diener et al. |

FOREIGN PATENT DOCUMENTS

| | | |
|---|---|---|
| JP | 2004-080691 | 3/2004 |
| JP | 2005-512423 | 4/2005 |
| JP | 2005-523616 | 8/2005 |
| JP | 2006-094003 | 4/2006 |
| JP | 2006-515120 | 5/2006 |

\* cited by examiner

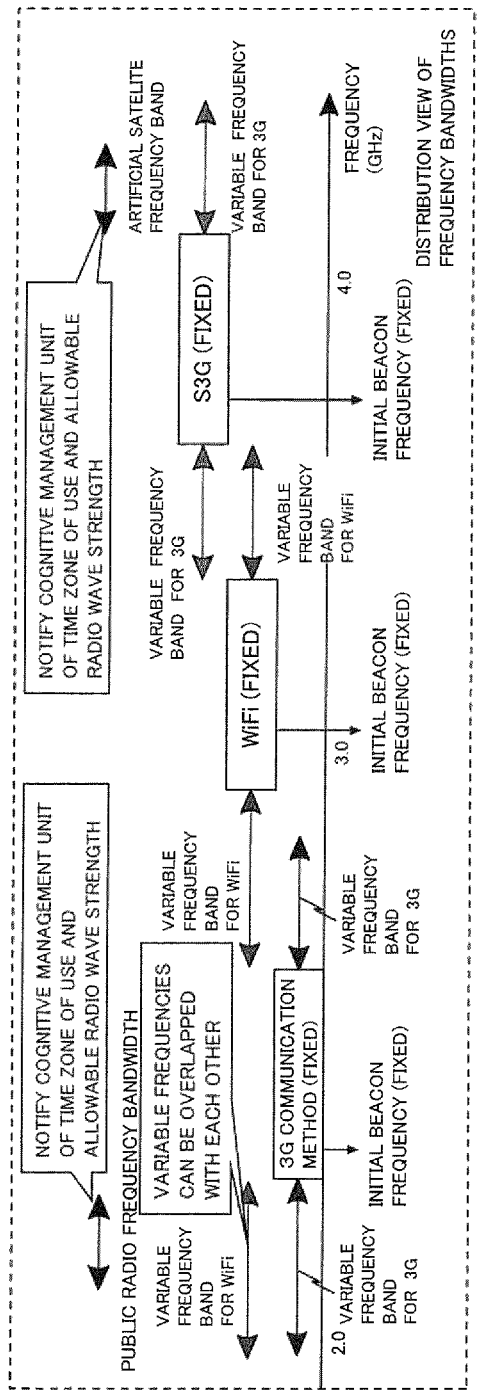

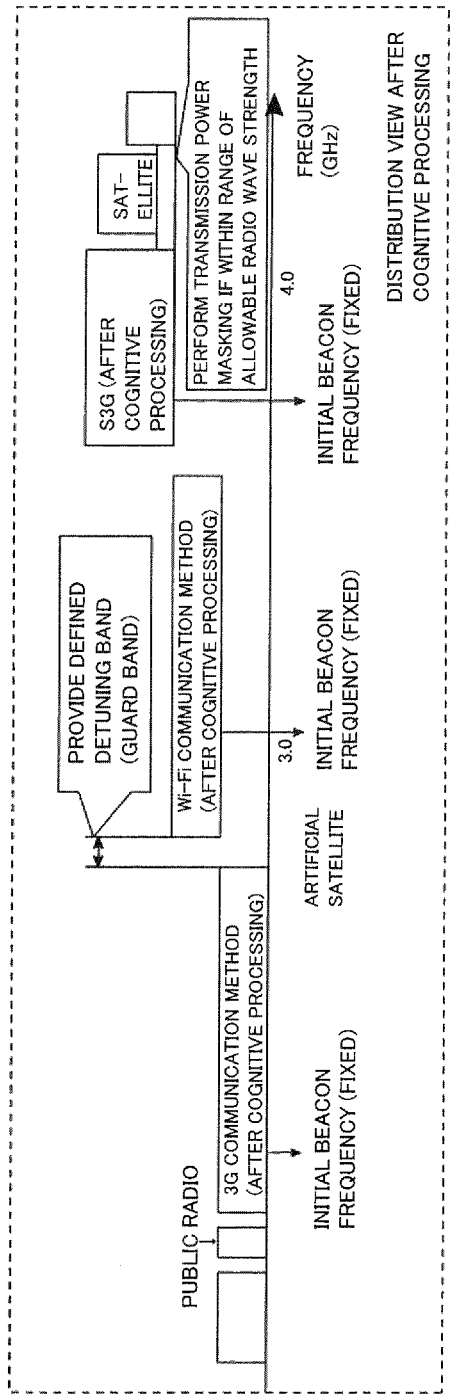

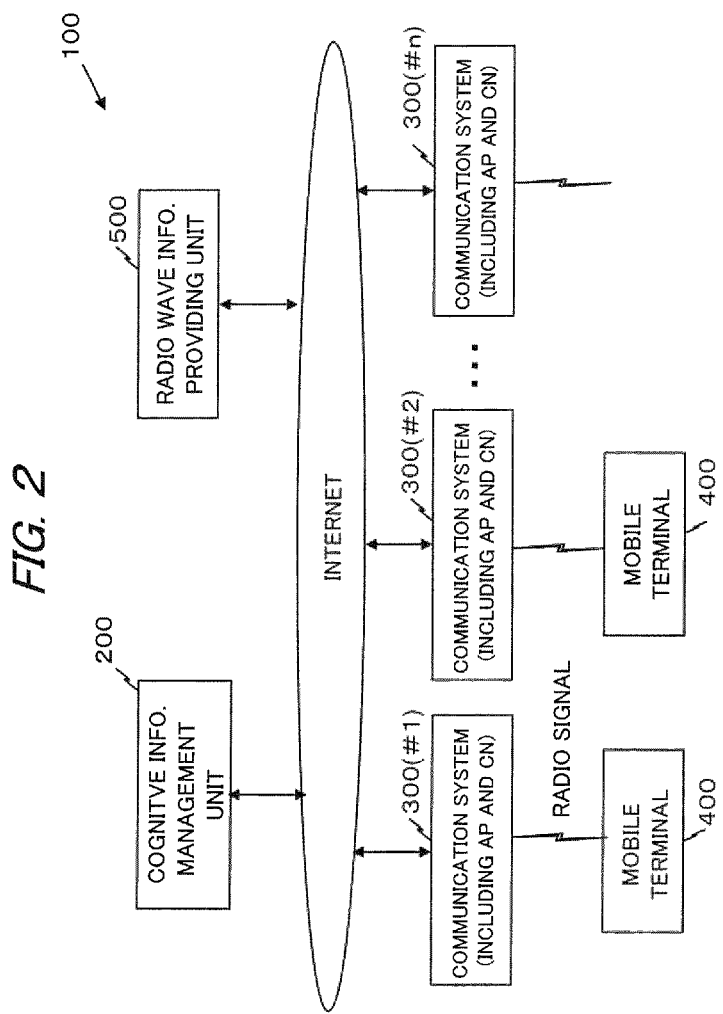

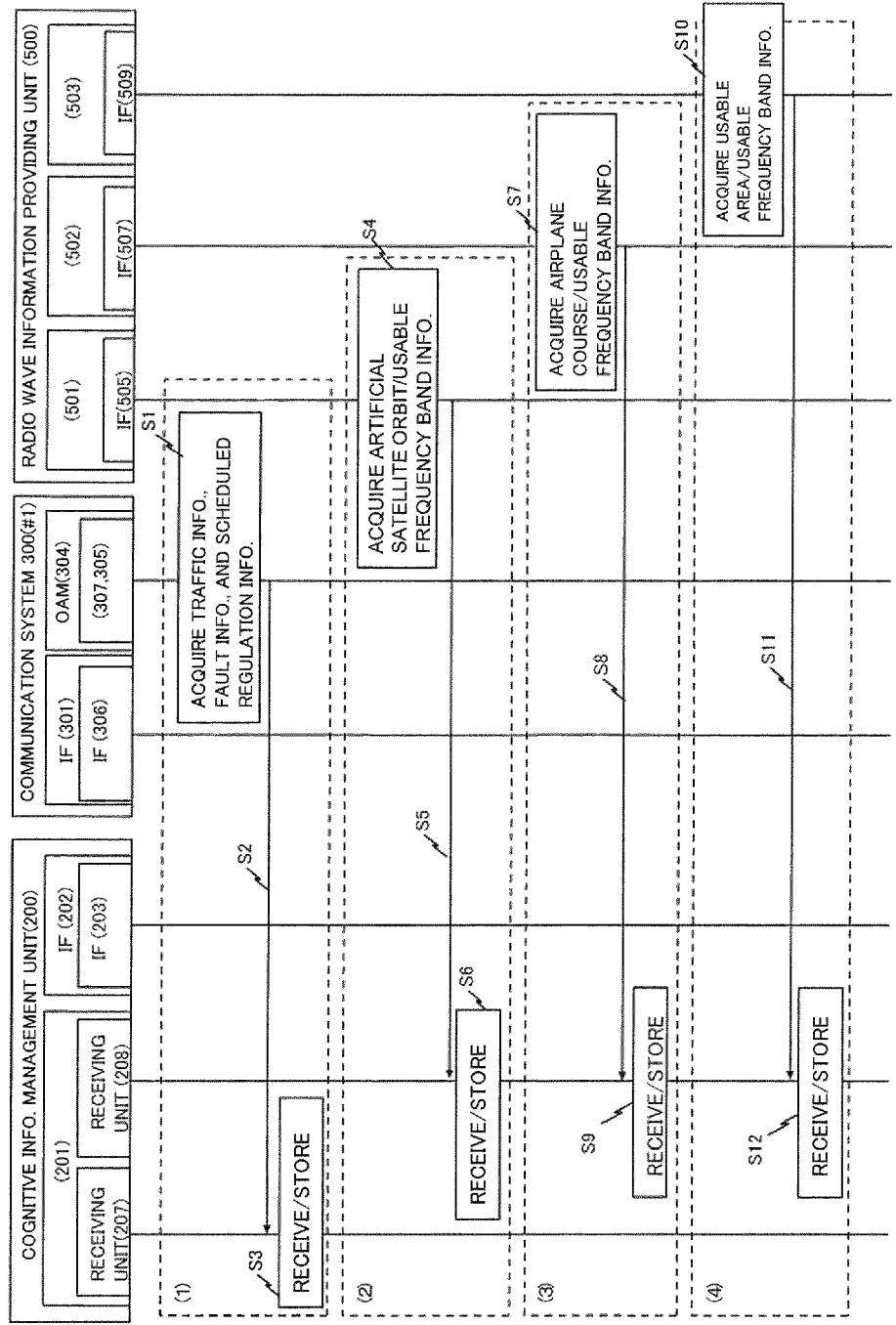

FIG. 8

OAM INFORMATION

COMMUNICATION METHOD=#1, COMMUNICATION TIME POINT=12:00

| ITEM | AREA | TIME POINT | VALUE |
|---|---|---|---|
| TRAFFIC INFORMATION | AREA A | 12:00 (MEASURED) | USAGE RATE: 30% |
| | | 13:00 (PREDICTED) | USAGE RATE: 35% |
| | | 14:00 (PREDICTED) | USAGE RATE: 0% |
| | AREA B | 12:00 (MEADURED) | USAGE RATE: 0% |
| | | 13:00 (PREDICTED) | USAGE RATE: 25% |
| | | 14:00 (PREDICTED) | USAGE RATE: 30% |
| | | ... | |
| FAULT INFORMATION | AREA A | 12:00 (MEASURED) | NO FAULT OCCURRED |
| | AREA B | 12:00 (MEASURED) | IN FAULT, UNAVAILABLE |
| | | ... | |
| REGULATION INFORMATION | AREA A | 12:00 (MEASURED) | NO REGULATION IMPOSED |
| | | 13:00 (PREDICTED) | NO REGULATION IMPOSED |
| | | 14:00 (PREDICTED) | REGULATION IMPOSED, UNAVAILABLE |
| | AERA B | 12:00 (MEASURED) | NO REGULATION IMPOSED |
| | | 13:00 (PREDICTED) | NO REGULATION IMPOSED |
| | | 14:00 (PREDICTED) | NO REGULATION IMPOSED |
| | | ... | |

FIG. 9

ARTIFICIAL SATELLITE ORBIT/USABLE FREQUENCY BAND INFORMATION

ARTIFICIAL SATELLITE MANAGEMENT UNIT #1, TIME POINT=12:00

| AREA | TIME POINT | PASSAGE INFORMATION | USABLE FREQUENCY BAND | DETUNING BANDWIDTH | ALLOWABLE RADIO WAVE STRENGTH |
|---|---|---|---|---|---|
| AREA A | 12:00 (MEASURED) | NA | — | | — |
| | 13:00 (PREDICTED) | SATELLITE A | 5010MHz~5050MHz | 5MHz | −75dBm |
| | | SATELLITE B | 5055MHz~5105MHz | 5MHz | −65dBm |
| | 14:00(PREDICTED) | SATELLITE C | 5010MHz~5050MHz | 5MHz | −75dBm |
| . . . | . . . | | | | . . . |

FIG. 10

AIRPLANE COURSE/USABLE FREQUENCY BAND INFORMATION

| AIR CONTROL UNIT #1, TRANSMISSION TIME POINT = 12:00 | | | | | |
|---|---|---|---|---|---|
| AREA | TIME POINT | PASSAGE INFORMATION | USABLE FREQUENCY BAND | DETUNING BANDWIDTH | ALLOWABLE RADIO WAVE STRENGTH |
| AREA A | 12:00 (MEASURED) | NA | — | | — |
| | 13:00 (PREDICTED) | AIRPLANE A | 4210MHz~4280MHz | 5MHz | −75dBm |
| | | AIRPLANE B | 4290MHz~4360MHz | 5MHz | −65dBm |
| | 14:00 (PREDICTED) | AIRPLANE C | 4210MHz~4280MHz | 5MHz | −75dBm |
| ... | | | ... | | |

FIG. 11

USABLE AREA/USABLE FREQUENCY BAND INFORMATION

| PUBLIC RADIO MANAGEMENT UNIT #1, TRANSMISSION TIME POINT = 12:00 ||||||
|---|---|---|---|---|---|
| AREA | TIME POINT | USAGE INFORMATION | USABLE FREQUENCY BAND | DETUNING BANDWIDTH | ALLOWABLE RADIO WAVE STRENGTH |
| AREA A | 12:00 (MEASURED) | NA | — | | — |
| | 13:00 (PREDICTED) | PUBLIC A | 2310MHz~2380MHz | 5MHz | NO ALLOWANCE |
| | | PUBLIC B | 2390MHz~2400MHz | 5MHz | NO ALLOWANCE |
| | 14:00 (PREDICTED) | PUBLIC C | 2310MHz~2380MHz | 5MHz | NO ALLOWANCE |
| | ... | ... | ... | | ... |

FIG. 12

VARIABLE FREQUENCY BAND INFORMATION
211

| COMMUNI-CATION METHOD | AREA | BAND NUMBER | FREQUENCY BAND | MINIMUM BANDWIDTH | BANDWIDTH UNIT | DE-TUNING BAND-WIDTH | MINIMUM TRANS-MISSION STRENGTH |
|---|---|---|---|---|---|---|---|
| COMMUNI-CATION METHOD 1 | AREA A | 1 | 2400MHz~2500MHz | 10MHz | 5MHz | 5MHz | -75dBm |
| | | 2 | 2700MHz~3000MHz | 10MHz | 5MHz | 5MHz | -75dBm |
| | AREA B | 1 | 2400MHz~2500MHz | 10MHz | 5MHz | 5MHz | -75dBm |
| | ... | | | ... | | | ... |
| COMMUNI-CATION METHOD 2 | AREA A | 1 | 2700MHz~3000MHz | 10MHz | 5MHz | 5MHz | -75dBm |
| | | 2 | 3000MHz~3600MHz | 20MHz | 10MHz | 10MHz | -65dBm |
| | ... | | | ... | | | ... |
| ... | | | | | | | |

FIG. 13

FIXED FREQUENCY BAND INFORMATION 212

| COMMUNI-CATION METHOD | AREA | BAND NUMBER | FREQUENCY BAND | INITIAL BEACON FREQUENCY | DETUNING BAND-WIDTH |
|---|---|---|---|---|---|
| COMMUNI-CATION METHOD 1 | AREA A | 1 | 2500MHz~2700MHz | 2601MHz | 5MHz |
| COMMUNI-CATION METHOD 1 | AREA B | 1 | 2500MHz~2700MHz | 2601MHz | 5MHz |
| COMMUNI-CATION METHOD 2 | AREA A | 1 | 3600MHz~4000MHz | 3601MHz | 10MHz |
| ... | | | ... | ... | ... |

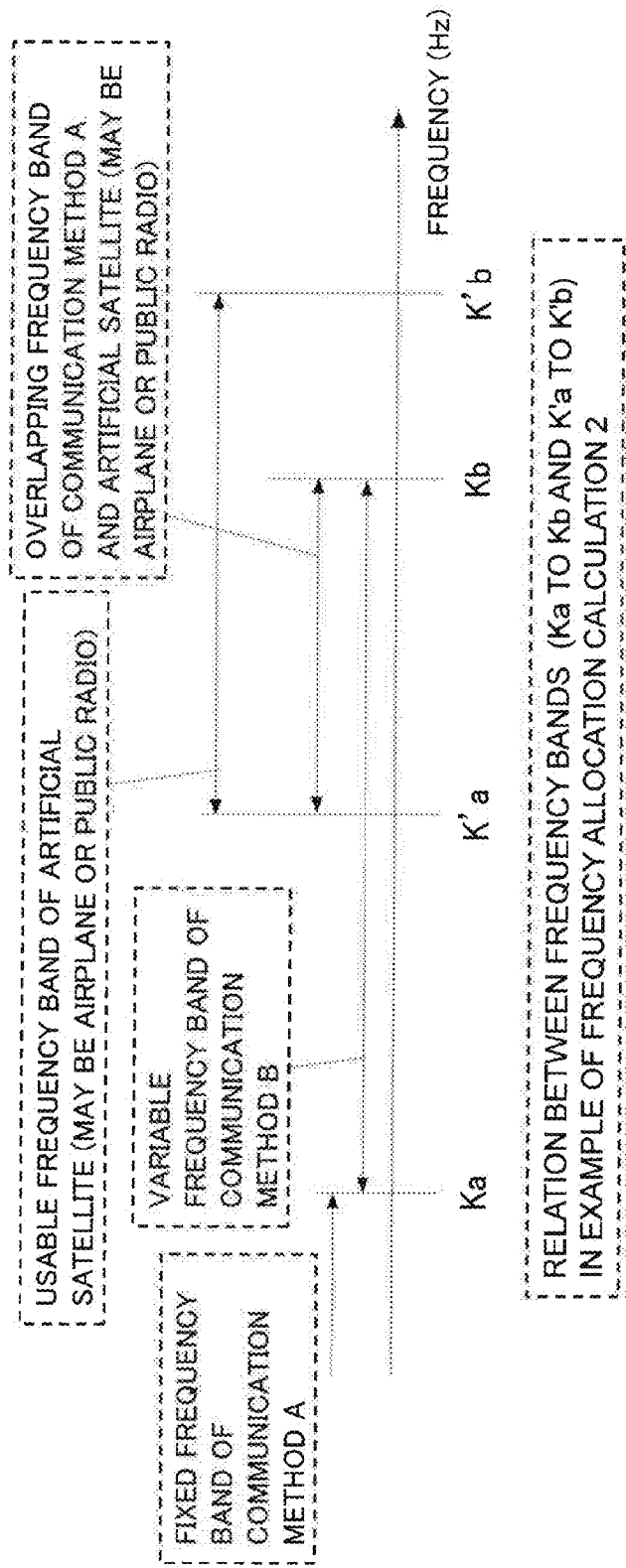

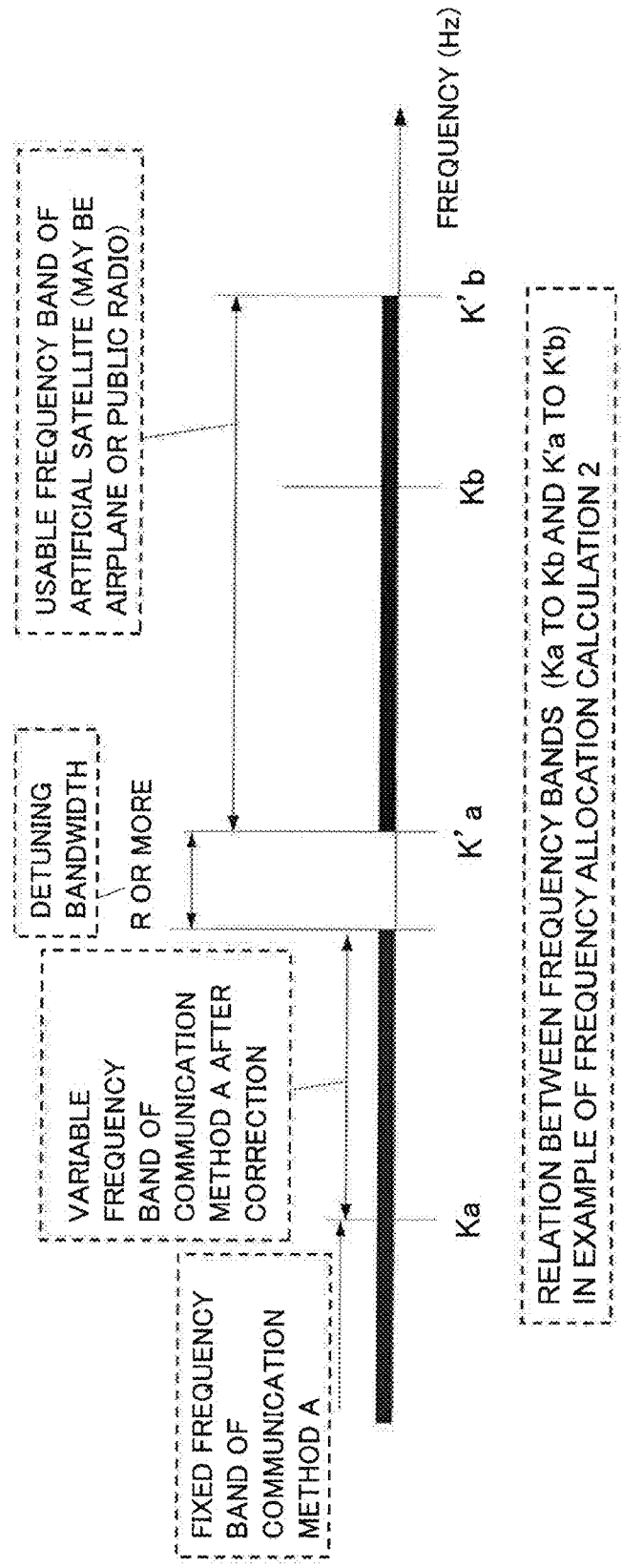

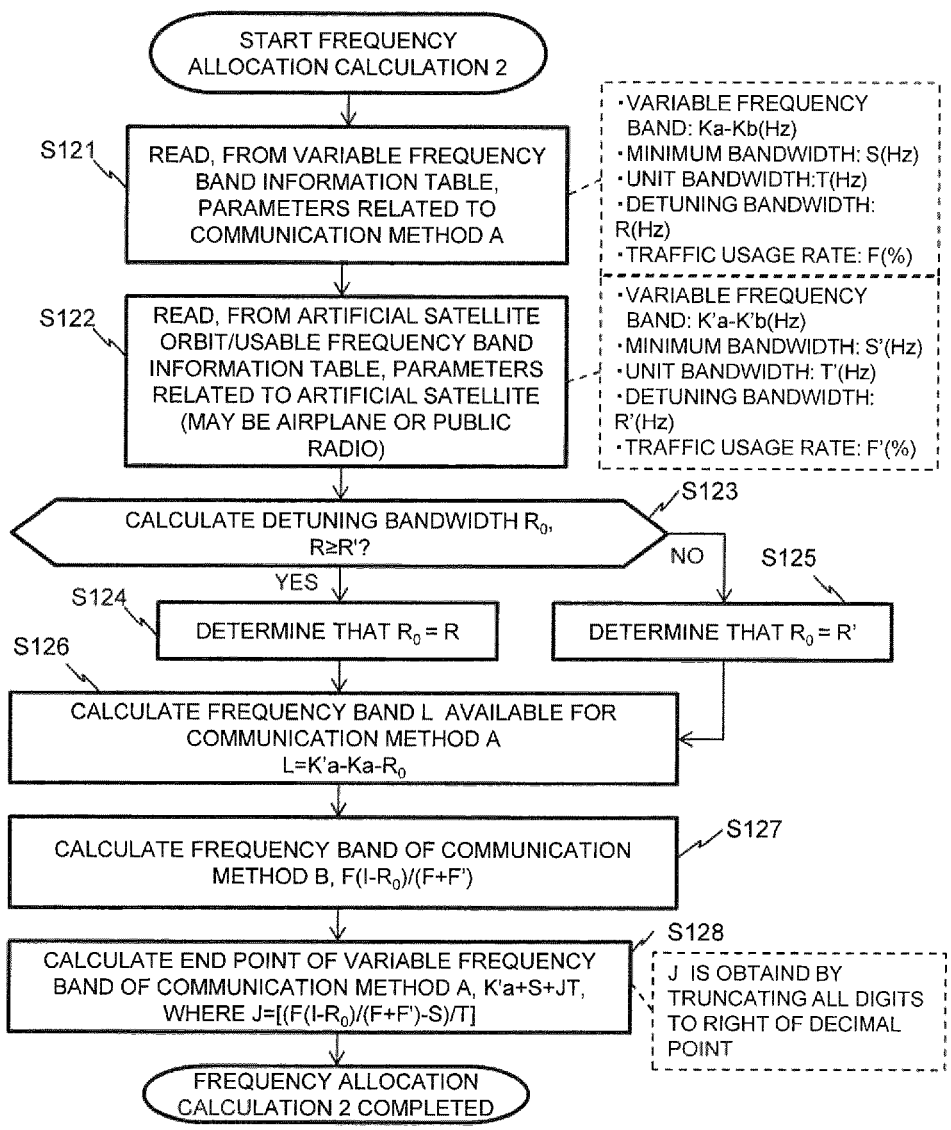

FIG. 20

COGNITIVE INFORMATION TABLE

GENERATION TIME POINT = 12:00

| COMMUNI-CATION METHOD | AREA | BEACON FREQUENCY | TIME POINT | BAND NUMBER | FREQUENCY BAND | ALLOWABLE RADIO WAVE STRENGTH | TRAFFIC INFO. | FAULT INFO. | REGULATION INFO. |
|---|---|---|---|---|---|---|---|---|---|
| METHOD 1 | AREA A | 2601MHz | 12:00 (MEASURED) | 1 | 2400MHz~3000MHz | NO LIMITATION | USAGE RATE: 30% | NO FAULT OCCURRED | NO REGULATION |
| | | | 13:00 (PREDICTED) | 1 | 2400MHz~3000MHz | NO LIMITATION | USAGE RATE: 35% | - | NO REGULATION |
| | | | 14:00 (PREDICTED) | 1 | 2500MHz~2700MHz | NO LIMITATION | USAGE RATE: 0% | - | REGULATION IMPOSED, UNAVAILABLE |
| | AREA B | 2601MHz | 12:00 (MEASURED) | 1 | 2500MHz~2700MHz | NO LIMITATION | USAGE RATE: 0% | IN FAULT, UN-AVAILABLE | NO REGULATION |
| | ... | ... | ... | ... | ... | ... | | | |
| METHOD 2 | AREA A | 3601MHz | 12:00 (MEASURED) | 1 | 3000MHz~4000MHz | NO LIMITATION | USAGE RATE: 30% | NO FAULT OCCURRED | NO REGULATION |
| | | | 13:00 (PREDICTED) | 1 | 3000MHz~4000MHz | NO LIMITATION | USAGE RATE: 35% | - | NO REGULATION |
| | | | 14:00 (PREDICTED) | 1 | 3600MHz~4000MHz | NO LIMITATION | USAGE RATE: 0% | - | REGULATION IMPOSED, UNAVAILABLE |
| | AREA B | 3601MHz | 12:00 (MEASURED) | 1 | 3600MHz~4000MHz | NO LIMITATION | USAGE RATE: 0% | IN FAULT, UNAVAILABLE | NO REGULATION |
| | ... | ... | | | | | | | |
| ... | | | | | | | | | |

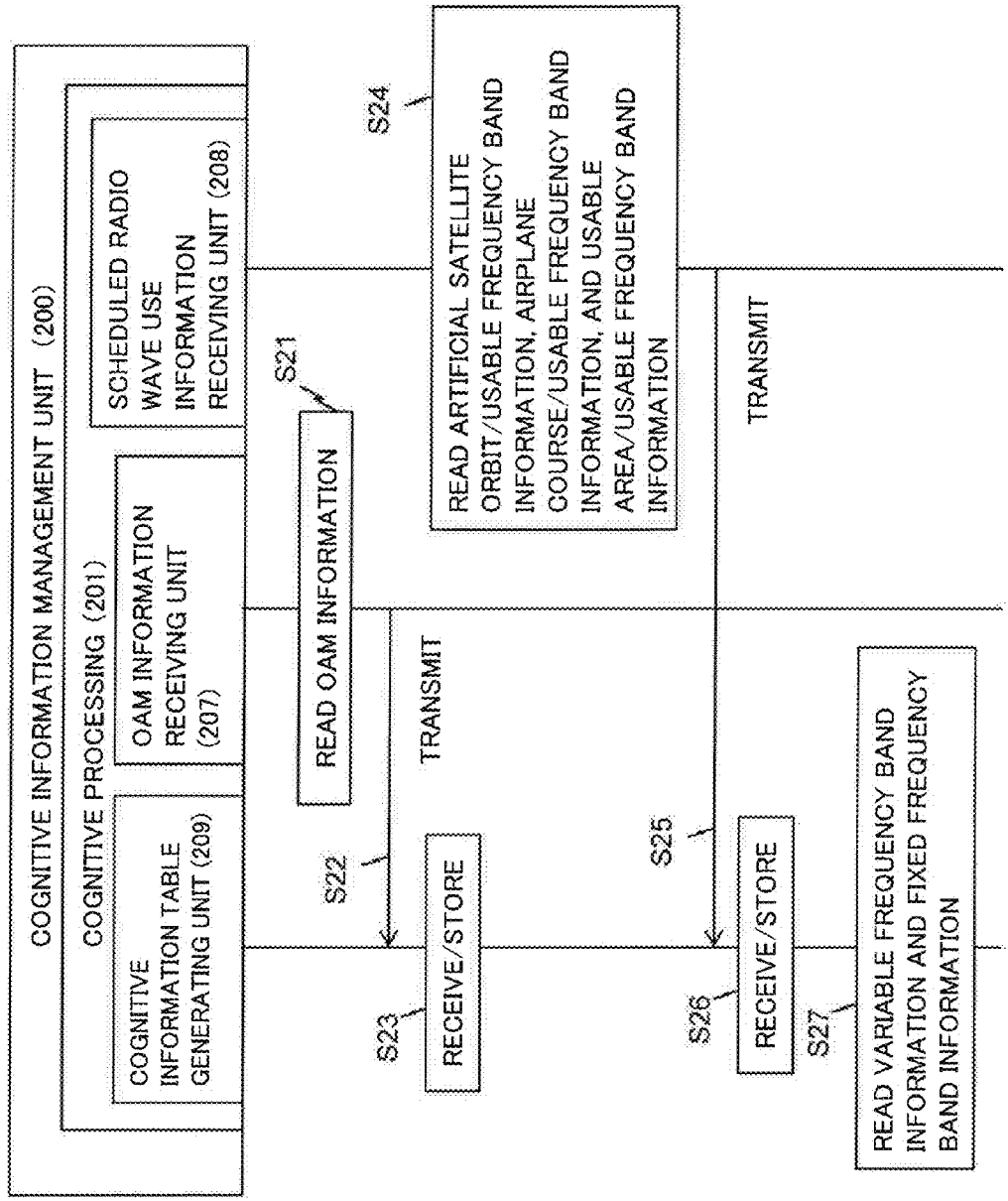

FIG. 23

INITIAL BEACON INFORMATION

| GENERATION TIME POINT=12:00 | | |
|---|---|---|
| COMMUNICATION METHOD | AREA | BEACON FREQUENCY |
| COMMUNICATION METHOD 1 | AREA A | 2601MHz |
| | AREA B | 2601MHz |
| | . . . | . . . |
| COMMUNICATION METHOD 2 | AREA A | 3601MHz |
| | AREA B | 3601MHz |
| | . . . | . . . |

FIG. 24

INITIAL BEACON INFORMATION (AREA A)

| GENERATION TIME POINT =12:00 | | |
|---|---|---|
| COMMUNICATION METHOD | AREA | BEACON FREQUENCY |
| COMMUNICATION METHOD 1 | AREA A | 2601MHz |
| COMMUNICATION METHOD 2 | AREA A | 3601MHz |
| ⋮ | ⋮ | ⋮ |

FIG. 26

COMMUNICATION METHOD/FREQUENCY BAND CHANGE INFORMATION

| GENERATION TIME POINT=12:00 | | | | | |
|---|---|---|---|---|---|
| COMMUNI-CATION METHOD | AREA | TIME | BAND NUMBER | FREQUENCY BAND | ALLOWABLE RADIO WAVE STRENGTH |
| COMMUNI-CATION METHOD 1 | AREA A | 12:00 (MEASURED) | 1 | 2400MHz~ 3000MHz | NO LIMITATION IMPOSED |
| | AREA B | 12:00 (MEASURED) | 1 | 2500MHz~ 2700MHz | NO LIMITATION IMPOSED |
| | ... | ... | ... | ... | ... |

FIG. 28

REQUEST LIST

| REQUIRED PARAMETER | CONTENTS |
|---|---|
| COMMUNICATION METHOD | COMMUNICATION METHOD 1 |
| | COMMUNICATION METHOD 2 |
| REQUIRED PARAMETER | FREQUENCY BAND |
| | TRAFFIC INFORMATION |
| | FAULT INFORMATION |
| | REGULATION INFORMATION |
| AREA | AREA A |
| ACQUISITION TIME ZONE | 12:00-13:00 |

FIG. 29

DETAILED LIST

| GENERATION TIME POINT=12:00 | | | | | |
|---|---|---|---|---|---|
| COMMUNI-CATION METHOD | AREA | TIME POINT | BAND NUM-BER | FREQUEN-CY BAND | ALLOWABLE RADIO WAVE STRENGTH |
| COMMUNI-CATION METHOD 1 | AREA A | 12:00 (MEASURED) | 1 | 2400MHz~ 3000MHz | NO LIMITATION IMPOSED |
| | AREA B | 12:00 (MEASURED) | 1 | 2500MHz~ 2700MHz | NO LIMITATION IMPOSED |
| | . . . | . . . | . . . | . . . | . . . |

FIG. 32

INITIAL BEACON

| GENERATION TIME POINT=12:00 | | |
|---|---|---|
| COMMUNICATION METHOD | AREA | BEACON FREQUENCY |
| COMMUNICATION METHOD 1 | AREA A | 2601MHz |
| COMMUNICATION METHOD 2 | AREA A | 3601MHz |
| . . . | . . . | . . . |

FIG. 35

SURROUNDING RADIO WAVE CONDITION
(RADIO WAVE CONDITION LIST)

| COMMUNICATION METHOD | FREQUENCY BAND | RADIO WAVE STRENGTH |
|---|---|---|
| COMMUNICATION METHOD 1 | 2400MHz~2500MHz | -50dBm |
| | 2700MHz~3000MHz | -70dBm |
| | . . . | . . . |
| COMMUNICATION METHOD 2 | 2700MHz~3000MHz | 5dBm |
| | 3000MHz~3600MHz | -30dBm |
| | . . . | . . . |
| . . . | . . . | . . . |

FIG. 37

PRIORITY LIST

| PRIORITY | WEIGHT | COMMUNI-CATION METHOD 1 | COMMUNI-CATION METHOD 2 | COMMUNI-CATION METHOD 3 |
|---|---|---|---|---|
| RADIO WAVE CONDITION | 1 | 6 | 5 | - |
|  |  |  |  |  |
|  |  |  |  |  |
|  |  |  |  |  |
|  |  |  |  |  |
| TOTAL |  |  |  |  |
| ORDER OF PRIORITY |  |  |  |  |

TERMINAL STATUS

| STATUS | CONTENTS |
|---|---|
| CURRENT LOCATION | AREA A |
| CURRENT TIME POINT | 12:30 |
| REMAINING BATTERY CHARGE | 80% |
| CORRESPONDING FUNCTION* | TRAFFIC INFORMATION FAULT INFORMATION REGULATION INFORMATION |

USER ACTION CONTENTS

| USER ACTION | CONTENTS |
|---|---|
| SERVICE CONTENTS | VOICE CALL |
| SCHEDULED USE TIME PERIOD | 12:30-13:30 |

FIG. 41

REQUEST LIST

| PARAMETER | CONTENTS |
|---|---|
| AREA | AREA A |
| COMMUNICATION METHOD | COMMUNICATION METHOD 1 |
| | COMMUNICATION METHOD 2 |
| REQUIRED PARAMETER | FREQUENCY |
| | TRAFFIC INFORMATION |
| | FAULT INFORMATION |
| | REGULATION INFORMATION |
| ACQUISITION TIME ZONE | 12:00-14:00 |

FIG. 42

DETAILED LIST

| GENERATION TIME POINT=12:00 | | | | | | | |
|---|---|---|---|---|---|---|---|
| AREA | COMMUNI-CATION METHOD | TIME POINT | BAND NUM-BER | FREQUENCY BAND | TRAFFIC INFORMATION | FAULT INFO. | REGULA-TION INFO. |
| AREA A | COMMUNI-CATION METHOD 1 | 12:00 (MEASURED) | 1 | 2400MHz~3000MHz | USAGE RATE: 30% | NO FAULT OCCURRED | NO REGULATION IMPOSED |
| | | 13:00 (PREDICTED) | 1 | 2400MHz~3000MHz | USAGE RATE: 35% | – | NO REGULATION IMPOSED |
| | COMMUNI-CATION METHOD 2 | 12:00 (MEASURED) | 1 | 3000MHz~4000MHz | USAGE RATE: 30% | NO FAULT OCCURRED | NO REGULATION IMPOSED |
| | | 13:00 (PREDICTED) | 1 | 3000MHz~4000MHz | USAGE RATE: 35% | – | NO REGULATION IMPOSED |

FIG. 44

PRIORITY LIST

| PRIORITY | WEIGHT | COMMUNI-CATION METHOD 1 | COMMUNI-CATION METHOD 2 | COMMUNI-CATION METHOD 3 |
|---|---|---|---|---|
| RADIO WAVE CONDITION | 1 | 6 | 5 | - |
| FREQUENCY | 1 | 5 | 0 | - |
| TRAFFIC | 1 | 7 | 7 | 10 |
|  |  |  |  |  |
|  |  |  |  |  |
| TOTAL |  |  |  |  |
| ORDER OF PRIORITY |  |  |  |  |

FIG. 46

PRIORITY LIST

| PRIORITY | WEIGHT | COMMUNI-CATION METHOD 1 | COMMUNI-CATION METHOD 2 | COMMUNI-CATION METHOD 3 |
|---|---|---|---|---|
| RADIO WAVE CONDITION | 1 | 6 | 5 | - |
| FREQUENCY | 1 | 5 | 0 | - |
| TRAFFIC | 1 | 7 | 7 | 10 |
| BATTERY | 1 | 5 | 0 | 5 |
| SERVICE | 1 | 0 | 5 | 10 |
| TOTAL | | | | |
| ORDER OF PRIORITY | | | | |

FIG. 47

REFERENCE EXAMPLE FOR DETERMINING
COMMUNICATION METHOD/FREQUENCY BAND

| PRIORITY | WEIGHT | COMMUNI-CATION METHOD 1 | COMMUNI-CATION METHOD 2 | COMMUNI-CATION METHOD 3 |
|---|---|---|---|---|
| RADIO WAVE CONDITION | 1 | 6 | 5 | - |
| FREQUENCY | 1 | 5 | 0 | - |
| TRAFFIC | 1 | 7 | 7 | 10 |
| BATTERY | 1 | 5 | 0 | 5 |
| SERVICE | 1 | 0 | 5 | 10 |
| TOTAL | | 23 | 15 | 25 |
| ORDER OF PRIORITY | | 2 | 3 | 1 |

# MOBILE TERMINAL

CROSS-REFERENCE TO RELATED APPLICATION

This is a continuation of Application PCT/JP2007/058283, filed on Apr. 16, 2007, now pending, the entire contents of which are herein wholly incorporated by reference.

FIELD

The invention relates to a mobile terminal.

BACKGROUND

In recent years, various wireless systems, such as cell phones and wireless LANs, have become widespread, and therefore, there has been a fear of exhaustion of frequency resources. The trend is shifting toward more and more various wireless systems being mixed. In view of the exhaustion of frequency resources, a need is expected to arise for such an environment in which improvement in radio wave utilization efficiencies of wireless systems is essential.

Currently, attention has been given to a wireless communication technology called a cognitive radio technology. The cognitive radio technology, which is also referred to as a communication environment recognizing technology, is a technology for achieving the improvement in radio wave utilization efficiencies of the wireless systems by appropriately recognizing a surrounding radio wave utilization environment and flexibly selecting an optimal frequency band, radio channel bandwidth, modulation method, access method, and the like. The cognitive radio technology has been receiving attention as a technology that has a potential to become a core of new generation mobile communication systems.

The implementation form of cognitive radio is still unclear. However, among the researchers, there is a growing core concept that "a plurality of wireless communication systems can adaptively utilize resources of 'time', 'frequencies', and 'space'". In addition, in recent years, the technology for software-defined radio has been making progress, and hence there soon comes the emergence of devices capable of flexibly changing the frequency band, the modulation method, and the like.

The currently-conceived method of utilizing the cognitive radio technology is such a method that enables a wireless terminal to automatically recognize its surrounding radio wave utilization environment, such as a frequency congestion status and a radio wave transmission method, to determine a frequency, a transmission method, and the like so as to perform efficient and appropriate communication in that environment, and to switch links so as to use that frequency, transmission method, and the like.

Patent Document 1: Japanese Laid-open Patent Publication No. 2006-515120
Patent Document 2: Japanese Laid-open Patent Publication No. 2005-523616
Patent Document 3: Japanese Laid-open Patent Publication No. 2005-512423

The currently-conceived method of utilizing the cognitive radio technology is a method in which the terminal selects a frequency based on the surrounding radio wave condition that the terminal itself can detect as far as possible. However, with this method, it is impossible to recognize a frequency band that might become available in the future, and also, there exist frequency bands that cannot be recognized by the mobile terminal, such as the frequency bands used for an artificial satellite and public radio. In addition, there is a problem in that it takes a long period of time to establish connection due to the fact that the surrounding radio wave utilization environment is recognized and judged.

SUMMARY

According to an aspect of the invention is a mobile terminal that performs wireless communication with one of a plurality of communication systems by using one of a plurality of communication methods, the one of the plurality of communication systems controlling the one of the plurality of communication methods. The mobile terminal includes: a reception unit to receive, from at least one of the plurality of communication systems, an initial beacon containing information for establishing communication according to each of the plurality of communication methods, the plurality of communication systems each controlling a corresponding one of the plurality of communication methods;

a request unit to use the information contained in the initial beacon to perform the communication with the at least one of the plurality of communication systems, to generate a provision request for information for determining a communication method and a frequency band, which are to be used in a time zone by the mobile terminal, and to transmit the provision request to the at least one of the plurality of communication systems; and a determination unit to determine, in response to the provision request, the communication method and the frequency band, which are to be used in the time zone by the mobile terminal, based on the information provided and received from the at least one of the plurality of communication systems, wherein the provided information contains, with regard to each communication method available for the mobile terminal, at least one of a measured value and a predicted value of each of usable frequency band information and operations, administration, and maintenance (OAM) information for the time zone.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 1A is a diagram illustrating a distribution view of frequency bands of communication methods applicable to a system according to an embodiment of the invention;

FIG. 1B is a diagram illustrating a distribution view of frequency bands after cognitive processing according to the embodiment of the invention;

FIG. 2 is a diagram illustrating an overall configuration example of a cognitive information delivery system according to the embodiment of the invention;

FIG. 7 is a sequence diagram illustrating processing of generating and transmitting information for generating a cognitive information table, which is performed in the cognitive information delivery system;

FIG. 8 is a table illustrating a data format example of OAM information transmitted from an OAM information transmitting unit 307;

FIG. 9 is a table illustrating a data format example of artificial satellite orbit/usable frequency band information transmitted from an artificial satellite management unit 501; and FIG. 10 is a table illustrating a data format example of airplane course/usable frequency band information transmitted from an air control unit 502.

FIG. 11 is a table illustrating a data format example of usable area/usable frequency band information transmitted from a public radio management unit 503;

FIG. 12 is a table illustrating a data format example of variable frequency band information;

FIG. 13 is a table illustrating a data format example of fixed frequency band information;

FIG. 17 is a diagram illustrating a relation between frequency bands of a communication method and an artificial satellite (Ka to Kb and K'a to K'b) in an example of frequency allocation calculation 2;

FIG. 18 is a diagram illustrating a relation between frequency bands adjusted through the frequency allocation calculation 2;

FIG. 19 is a flow chart illustrating a processing example of the cognitive information table generating unit, which is related to the frequency allocation calculation 2; and FIG. 20 is a table illustrating a data format example of a cognitive information table.

FIG. 21 is a sequence diagram illustrating an example of cognitive information table generation;

FIG. 23 is a table illustrating a data format example of initial beacon information;

FIG. 24 is a table illustrating an example of an initial beacon to be transmitted toward the mobile terminal;

FIG. 26 is a table illustrating a data format example of communication method/frequency band change information;

FIG. 27 is a sequence diagram illustrating an operational example of procedures related to changing of the frequency band and the like;

FIG. 28 is a table illustrating a data format example of a request list;

FIG. 29 is a table illustrating a data format example of a detailed list;

FIG. 32 is a table illustrating an example of the initial beacon received by the mobile terminal 400;

FIG. 35 is a table illustrating a data format example of a radio wave condition list indicating surrounding radio wave conditions listed by the communication method/frequency band determining unit;

FIG. 37 is a table illustrating a data format example of the priority list;

FIG. 41 is a table illustrating a data format example of the request list.

FIG. 42 is a table illustrating an example of the detailed list;

FIG. 44 is a table illustrating a data format example of the priority list generated through the processing illustrated in FIG. 43;

FIG. 46 is a table illustrating a data format example of the priority list that contains the priorities set based on remaining battery charges and the service contents;

FIG. 47 is a table illustrating a reference example for determining the communication method/frequency band, which is used by the communication method/frequency band determining unit in processing of determining the communication method/frequency band;

DESCRIPTION OF EMBODIMENT

Figure 3:
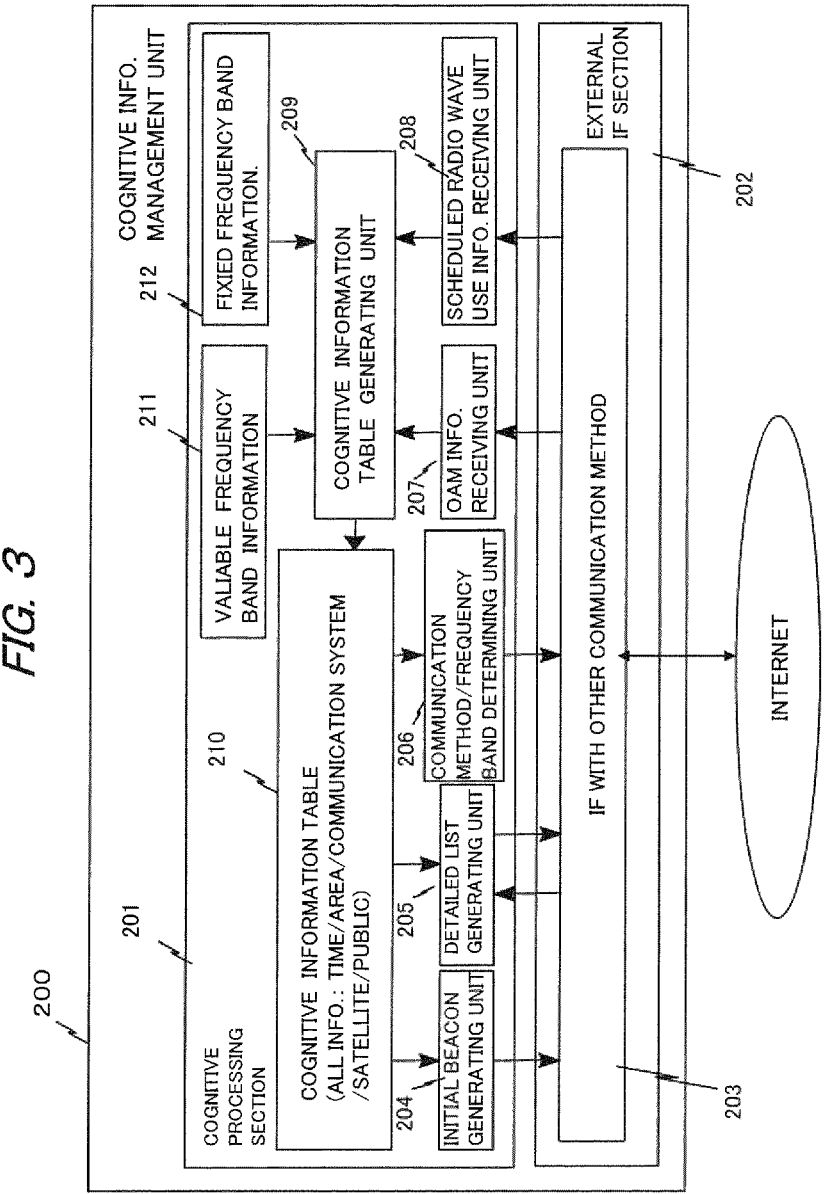
FIG. 3 is a diagram illustrating a functional block configuration example of a cognitive information management unit 200 illustrated in FIG. 2.

Hereinafter, referring to the drawings, description is given of an embodiment of the invention. The configuration of the embodiment is merely an example, and the invention is not limited to the configuration of the embodiment.

Outline of Embodiment

According to the embodiment of the invention, there is generated a database that manages, in an integrated manner, a large amount of radio wave utilization conditions ranging from a current condition to a future schedule. At the time of communication, a mobile terminal refers to the database to select a more appropriate frequency band. By employing this method, it becomes possible to manage the utilization conditions of artificial satellites and public radio (such as police radio), resulting in utilization of a broader frequency spectrum.

Here, a cognitive radio technology originally means that "a mobile terminal judges its surrounding radio wave environment by itself to select an appropriate frequency band". However, according to the embodiment, the current and future radio wave conditions around the terminal are transmitted as information (also referred to as communication environment information or cognitive information) to the terminal, to thereby enable the terminal to recognize and select a frequency. In addition, the embodiment enables a hybrid system (only information that the terminal cannot recognize by any means (such as a scheduled usable frequency of an artificial satellite) is transmitted) by using the original cognitive radio technology.

The main functions and operations of a system according to the embodiment of the invention are described in the following (I) and (II).

(I) Generation of Information Table (Referred to as "Cognitive Information Table") Necessary for Efficient Allocation of Frequencies and Frequency Band Change of Each Communication System
(1) From the communication systems controlling the respective communication methods, traffic information, fault information, and regulation information are acquired.
(2) Information regarding the frequencies and areas used by artificial satellites, airplanes, and public radio is acquired.
(3) Based on the information acquired in the above-mentioned (1) and (2), an information table (cognitive information table) necessary for the efficient allocation of frequencies and the frequency band change of a communication system is generated.
(4) Based on the information within the cognitive information table, each communication system changes the allocation of frequencies. Here, it is assumed that there are three types of frequency use, which are a fixed value, a variable value, and an initial beacon value (information containing frequencies that can be fixedly used by the mobile terminal in the respective communication methods in order to establish communication when the communication environment information is acquired).

FIG. 1A is a diagram illustrating a distribution view of frequency bands that are defined by a plurality of communication methods applicable to the embodiment. FIG. 1B is a diagram illustrating a distribution view of frequency bands after cognitive processing (processing of allocating optimal frequency bands to the respective communication methods based on the communication environment information of the respective communication methods) according to the embodiment.

In the example illustrated in FIG. 1A, as the communication methods, there are illustrated 3G (3rd Generation), S3G (Super 3G), and wireless fidelity (Wi-Fi). Each of the communication methods has a fixed frequency band, a variable frequency band, and an initial beacon frequency (fixed). Further, in the example illustrated in FIG. 1A, the variable frequency bands of Wi-Fi and 3G overlap the usable frequency band of the public radio, whereas the variable frequency band of S3G overlaps the usable frequency band of the artificial satellite.

According to the embodiment, the frequency allocation is performed based on the cognitive processing with respect to the distribution of frequency bands illustrated in FIG. 1A. As a result, as illustrated in FIG. 1B, each communication method can use an optimal frequency band, and also, it is possible to determine the usable frequency band of each communication method so as not to overlap the usable frequency band of the public radio or the artificial satellite.

(II) Information Acquisition by Mobile Terminal
The mobile terminal acquires basic information regarding frequencies from an initial beacon, and then acquires detailed cognitive information (communication environment information of each communication method). The procedures are as follows.
(1) The mobile terminal acquires the basic information from the initial beacon.
(2) Based on the basic information, the mobile terminal requests and acquires the detailed cognitive information.
(3) The mobile terminal compares the cognitive information with various information stored in the mobile terminal itself, and then determines a communication system to be used.
(4) The mobile terminal starts a communication by using the determined communication system.

In a cognitive information delivery system according to the embodiment, information on traffic, fault, regulation, and the like of the respective communication systems (communication methods) is collected and managed in an integrated manner. With this configuration, the frequency band to be used in each communication system can be optimized. For example, for a communication system that is suffering a fault or is under a maintenance regulation, the usable frequency band is made narrower, and other communication methods operating normally are allocated with broader frequency bands. In another case, when there is a communication system having a large amount of traffic, that communication system is allocated with a broader frequency band than the frequency bands of the other communication methods that have a less amount of traffic.

Further, according to the embodiment, in addition to the above-mentioned information, there is collected information on usable radio bands of artificial satellites, airplanes, and public radio, on usable areas thereof, and on passage of an artificial satellite or an airplane. With this configuration, it becomes possible to use such frequency bands that used to be unavailable for a mobile communication system, which therefore results in a further improvement in frequency utilization rate. For example, in an area where and at a time when no artificial satellite passes, the frequency band allocated to the artificial satellite can be made available for the mobile communication system.

Further, with the mobile terminal according to the embodiment, in addition to the radio wave condition recognized by the terminal itself, information that the terminal cannot know (frequency use condition in the future) is used as a judgment factor for determining the frequency, and hence further optimization of frequencies can be realized.

Further, according to the embodiment, in addition to the surrounding radio wave condition recognized by the mobile terminal itself, the terminal receives the current and future radio wave conditions there around as information from the database, and hence the terminal can select a more appropriate frequency. At the time of selection, by using a simple algorithm, it is possible to realize reduction of a time period required in judging the frequency.

Further, according to the embodiment, a hybrid method (only information that the terminal cannot recognize by any means (such as the scheduled usable frequency of an artificial satellite) is transmitted) is also conceivable by using the original cognitive radio technology.

[System Configuration]

FIG. 2 is a diagram illustrating an overall configuration example of the cognitive information delivery system according to the embodiment. In FIG. 2, a cognitive information delivery system 100 is configured by four segments, which are a cognitive information management unit 200, a plurality of (n) communication systems (communication methods) 300 (#1 to #n), mobile terminals 400, and a radio wave information providing unit 500.

The cognitive information management unit 200, the communication systems 300, and the radio wave information providing unit 500 are connected to one another via the Internet. The communication system 300 is capable of communication with the mobile terminal 400 via a wireless link.

<Cognitive Information Management Unit>

FIG. 3 is a diagram illustrating a functional block configuration example of the cognitive information management unit 200 illustrated in FIG. 2. The cognitive information management unit 200 receives operations, administration, and maintenance (OAM) information from each communication system, and receives the radio wave information from the radio wave information providing unit 500, to thereby generate a cognitive information table 210. Further, the cognitive information management unit 200 transmits, to each of the communication systems 300, an initial beacon and communication method/frequency band change information. Further, the cognitive information management unit 200 transmits a detailed list in response to a request from the mobile terminal. The cognitive information management unit 200 is implemented as a server device (information delivery device) connected to the Internet.

The server device is an information processing apparatus including a processor such as central processing unit (CPU), a storage device (memory) as a computer readable medium, an input/output device (I/O), and a communication interface (IF). With the CPU executing a computer program stored in the storage device, a function as the cognitive information management unit 200 is implemented.

The cognitive information management unit 200 includes an external interface (external IF) section 202 and a cognitive processing section 201. The external IF section 202 includes an interface for other communication method 203.

The cognitive processing section 201 includes an initial beacon generating unit 204, a detailed list generating unit 205, a communication method/frequency band determining unit 206, an OAM information receiving unit 207, a scheduled radio wave use information receiving unit 208, a cognitive information table generating unit 209, and the cognitive information table 210.

The IF for other communication method 203 controls an interface for performing, via the Internet network, communication with the communication systems 300 (#1 to #n), the mobile terminals 400, and the radio wave information providing unit 500. Each of the communication systems 300 (#1 to #n) operates one of a plurality of communication methods #1 to #n.

The initial beacon generating unit 204 serving as a delivery unit generates, based on the contents stored in the cognitive information table 210, initial beacon information necessary for the communication systems #1 to #n to perform transmission to the mobile terminals 400, and then, via the IF for other communication method 203, transmits the initial beacon information to the communication systems #1 to #n.

When a request (request list) for a detailed list necessary for determining the communication method has been received from the mobile terminal 400, the detailed list generating unit 205 serving as a delivery unit generates a detailed list corresponding to the contents of the request list based on the cognitive information table 210, and then transmits the detailed list to the mobile terminal 400 via the IF for other communication method 203 and at least one of the communication systems #1 to #n.

In order to notify the communication systems #1 to #n of information on change in frequency bands, the communication method/frequency band determining unit 206 serving as a change information generating unit and a delivery unit uses the cognitive information table 210 to generate communication method/frequency band change information, and then transmits the communication method/frequency band change information to the communication systems #1 to #n.

In order to acquire the OAM information from the communication systems #1 to #n, the OAM information receiving unit 207 serving as an OAM information collecting unit receives, via the IF for other communication method 203, the OAM information transmitted by an OAM information transmitting unit 307 (FIG. 4) of an OAM unit provided to each of the communication systems #1 to #n.

In order to collect the scheduled radio wave use information managed in respective management units 501, 502, and 503 (FIG. 6) configuring the radio wave information providing unit 500, the scheduled radio wave use information receiving unit 208 serving as a radio wave information collecting unit receives the scheduled radio wave use information via the IF for other communication method 203.

The cognitive information table generating unit 209 serving as a database generating unit and a reflecting unit generates the cognitive information table 210 (database) based on the OAM information received by the OAM information receiving unit 207, the scheduled radio wave use information received by the scheduled radio wave use information receiving unit 208, and a variable frequency band information table 211 and a fixed frequency band information table 212 generated as data on a recording medium.

The cognitive information table 210 is generated in the storage device provided to the cognitive information management unit 200. The cognitive information table 210 is generated in order to provide the initial beacon information and the communication method/frequency band change information to the communication systems #1 to #n. Further, the cognitive information table 210 is generated in order to provide the detailed list to the mobile terminal 400.

The variable frequency band information table 211 is a table recorded with information on a frequency band that can be treated as a variable frequency band among frequency bands available for each of the communication systems #1 to #n.

The fixed frequency band information table 212 is a table recorded with information on a frequency band that is treated as a fixed frequency band among frequency bands available for each of the communication systems #1 to #n.

The OAM information is a collective term for the traffic information, the fault information, and the scheduled regulation information managed in the OAM units of the communication systems #1 to #n. The OAM information is described later.

<Communication Method (Communication System)>

Figure 4:
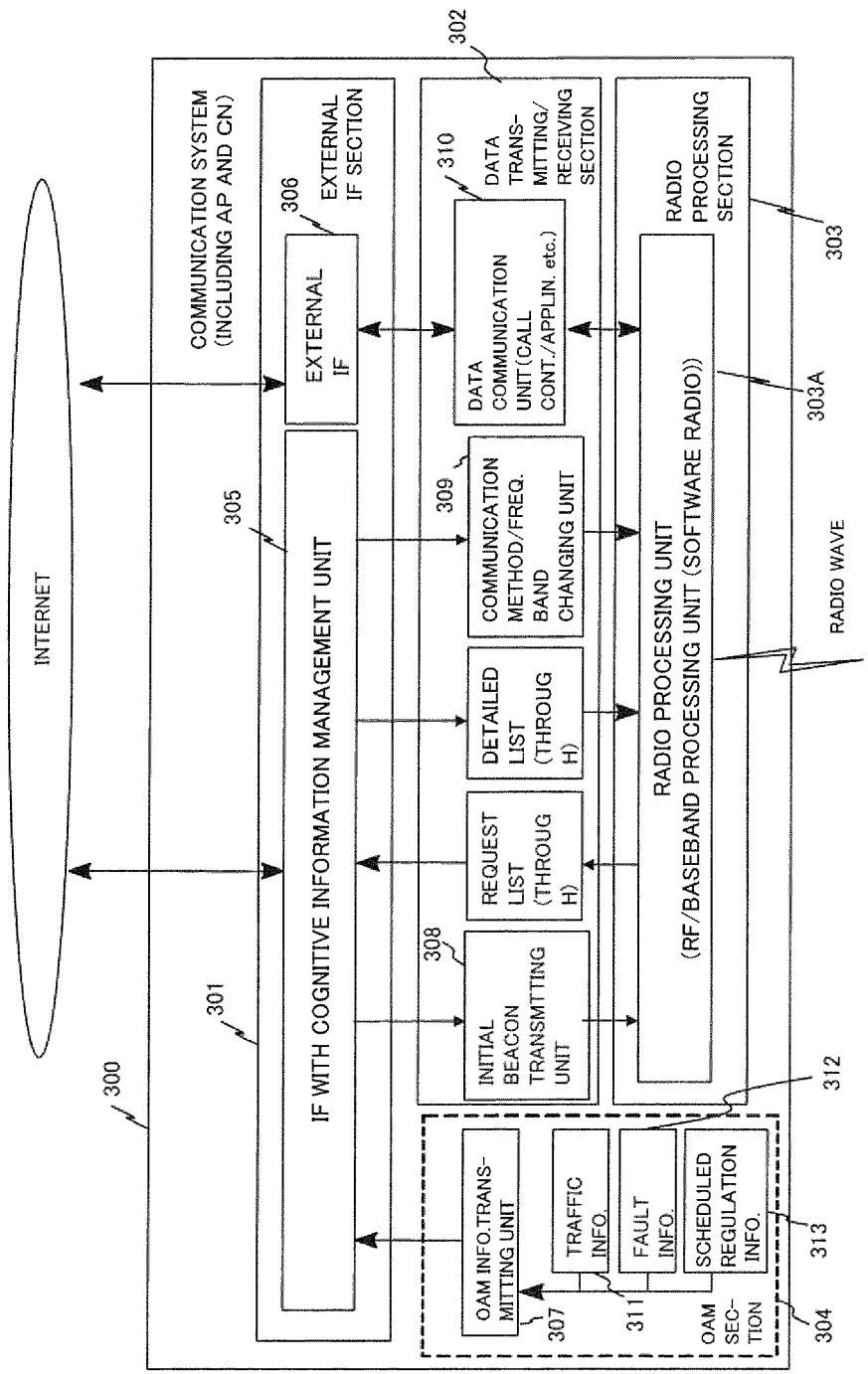
FIG. 4 is a diagram illustrating a functional block configuration example of each of communication systems 300 (communication methods #1 to #n) illustrated in FIG. 2.

FIG. 4 is a diagram illustrating a functional block configuration example of each of the communication systems 300 (#1 to #n) illustrated in FIG. 2. The communication systems 300 represent infrastructures that process various communication methods such as S3G, WiMAX, 3G, 2G (PDC), PHS, and public wireless LAN. The communication systems 300 each function as a communication device or a communication system that controls processing on the network side in each communication method. For example, in a case where the communication system #1 is a communication system that handles 3G, a plurality of functions provided to the communication system #1 are implemented on a radio network controller (RNC) and a base transceiver station (BTS).

Here, in FIG. 2, the communication system 300 (each of #1 to #n) is illustrated as a concept that includes an access point (AP) to the communication system 300 and a core network (CN) connecting between communication systems.

The communication system 300 performs processing of transmitting the OAM information to the cognitive information management unit 200, processing of transmitting the initial beacon to the mobile terminal 400, and other processing. In FIG. 4, the communication system 300 functions as a device including an external IF section 301, a data transmitting/receiving section 302, a radio processing section 303, and an OAM section 304.

The external IF section 301 includes an IF for cognitive information management unit 305 and an external IF 306. The IF for cognitive information management unit 305 is an interface for performing, via the Internet network, communication with the IF for other communication method of the cognitive information management unit 200.

Further, the external IF 306 is an interface for performing transmission/reception of data related to call processing that corresponds to each communication method, U-Plane data, an application, and the like. The external IF 306 is an interface for transmitting/receiving all data excluding data exchanged with the cognitive information management unit 200.

The data transmitting/receiving section 302 includes an initial beacon transmitting unit 308, a communication method/frequency band changing unit 309, and a data communication unit 310. Further, the data transmitting/receiving section 302 transfers, to the IF 305, a request list from a radio processing unit 303A (mobile terminal 400), and also relays, to the radio processing unit 303A, a detailed list from the IF 305 (cognitive information management unit 200).

Here, the initial beacon transmitting unit 308 transmits, to the radio processing unit 303A, the initial beacon information transmitted from the initial beacon generating unit 204 of the cognitive information management unit 200.

The communication method/frequency band changing unit 309 receives the communication method/frequency band change information from the communication method/frequency band determining unit 206 of the cognitive information management unit 200, and then carries out changing of a frequency band and an allowable radio wave strength for the radio processing unit 303A. The data communication unit 310 transmits/receives data such as data related to call processing that corresponds to each communication method 300, U-Plane data, an application, and the like.

The radio processing section 303 includes the radio processing unit (RF/baseband processing unit (software-defined radio)) 303A. The radio processing unit 303A is an air interface for the mobile terminal 400, and is capable of transmitting/receiving various data through wireless communication with the mobile terminal 400. Further, radio frequency (RF) processing, baseband processing, and the like performed by the radio processing unit 303A are implemented by the software-defined radio, and hence, according to an instruction determined by the communication method/frequency band changing unit 309, the radio processing unit 303A performs the changing of the frequency band and the allowable radio wave strength.

The OAM section (OAM information unit) 304 includes the OAM information transmitting unit 307. The OAM information transmitting unit 307 collects the traffic information, the fault information, the scheduled regulation information, and the like corresponding to the communication method, and then, via the IF for cognitive information management unit 305, transmits the traffic information, the fault information, the scheduled regulation information, and the like to the OAM information receiving unit 207 of the cognitive information management unit 200.

The traffic information, the fault information, the scheduled regulation information, and the like are stored within a table generated in the storage device provided to the communication system 300. In the example illustrated in FIG. 4, there are illustrated, as an example, a traffic information table 311 that stores the traffic information, a fault information table 312 that stores the fault information, and a scheduled regulation information table 313 that stores the scheduled regulation information.

Here, the table 311 is recorded with, as the traffic information, a measured value and/or a predicted value of a communication amount (number of users, band used by users) within the communication method 300. Further, the table 312 is recorded with, as the fault information, information on whether or not a fault (communication fault (link fault, device fault) etc.) has occurred (measured value) within the communication system 300. The table 313 is recorded with, as the scheduled regulation information, information on whether or not there is any regulation (measured value or predicted value) within the communication system 300.

The OAM section 304 collects the OAM information regularly or irregularly to update the respective tables 311 to 313. The OAM information transmitting unit 307 is capable of transmitting the OAM information regularly or for each request made by the cognitive information management unit 200.

<Mobile Terminal>

Figure 5:
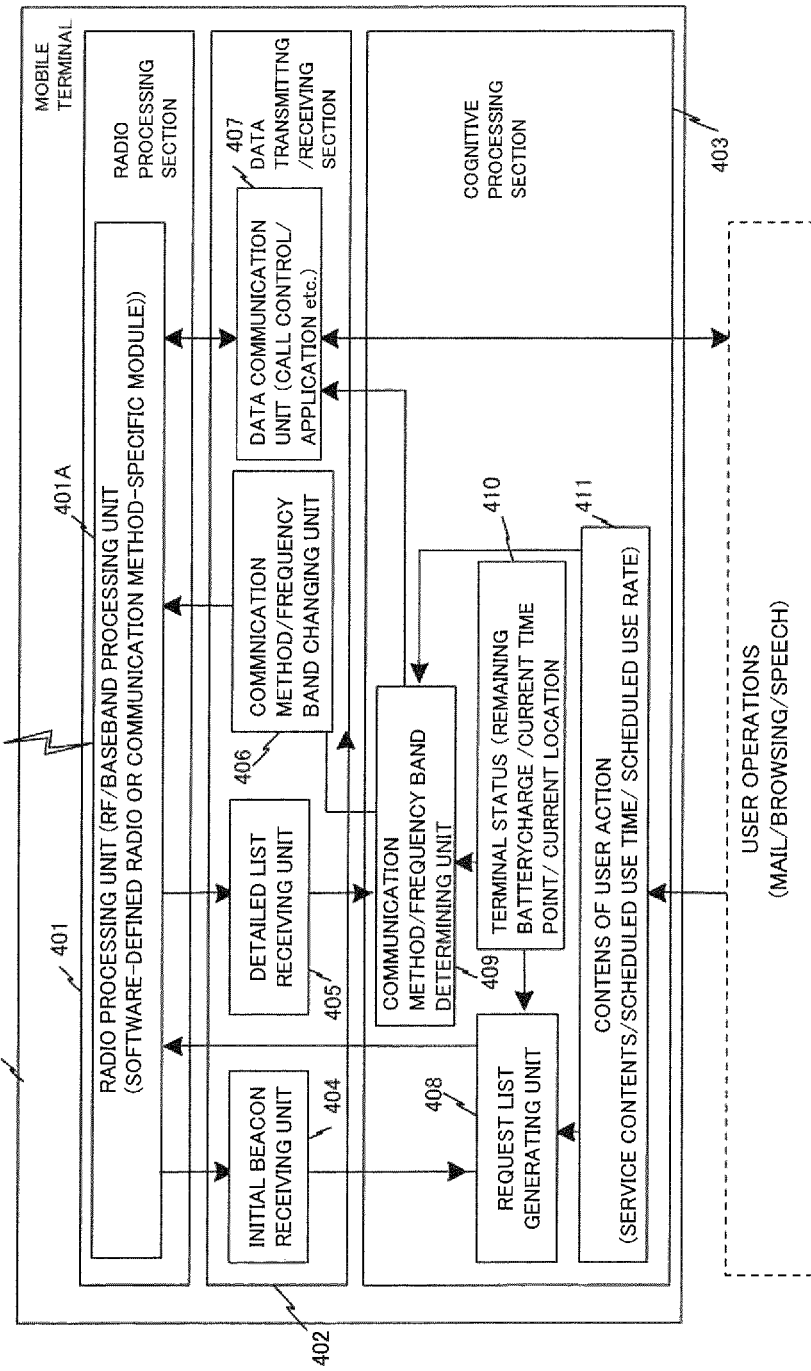
FIG. 5 is a diagram illustrating a functional block configuration example of a mobile terminal illustrated in FIG. 2.

FIG. 5 is a diagram illustrating a functional block configuration example of the mobile terminal 400 illustrated in FIG. 2. In FIG. 5, the mobile terminal 400 is a terminal device capable of communication by using two or more of a plurality of the communication systems (communication methods) #1 to #n.

The mobile terminal 400 includes a radio processing section 401, a data transmitting/receiving section 402, and a cognitive processing section 403, and implements communication with the communication method 300.

The radio processing section 401 includes a radio processing unit (RF/baseband processing unit (software-defined radio or communication method-specific module)) 401A.

The radio processing unit 401A serving as an acquisition unit is an air interface for the communication system 300, and is capable of transmitting/receiving various data through wireless communication with the communication system 300. Further, the RF processing, the baseband processing, and the like performed by the radio processing unit 401A are implemented by modules corresponding to the software-defined radio or the respective communication methods, and, according to an instruction from a communication method/ frequency band changing unit 406, it is possible to change the frequency band and the allowable radio wave strength.

The data transmitting/receiving section 402 includes an initial beacon receiving unit 404, a detailed list receiving unit 405, the communication method/frequency band changing unit 406, and a data communication unit 407.

The initial beacon receiving unit 404 serving as a reception unit receives the initial beacon transmitted from the initial beacon transmitting unit 308 of the communication system 300. Further, when an acquisition request for the initial beacon has been made by a request list generating unit 408, the initial beacon receiving unit 404 transfers, in response to the acquisition request, the initial beacon received by the radio processing unit 401A to the request list generating unit 408.

The detailed list receiving unit 405 serving as a reception unit receives the detailed list from the detailed list generating unit 205 (FIG. 3) of the cognitive information management unit 200, and then transmits the detailed list to a communication method/frequency band determining unit 409.

The data communication unit 407 transmits/receives various data, such as data related to call processing between the mobile terminal 400 and each of the communication systems 300, U-Plane data, and an application.

The cognitive processing section 403 includes the request list generating unit 408 and the communication method/frequency band determining unit 409. The request list generating unit 408 serving as an acquisition unit and a request unit generates a request list that lists delivery requests for cognitive information to be determined based on a terminal status 410 and user action contents 411, and then transmits the request list to the radio processing unit 401A. The request list is transmitted to the detailed list generating unit 205 of the cognitive information management unit 200.

The communication method/frequency band determining unit 409 serving as an acquisition unit and a determination unit determines the communication method/frequency band to be used by the mobile terminal 400 based on the detailed list transmitted from the detailed list receiving unit 405, the terminal status 410, and the user action contents 411. The determined communication method/frequency band are transmitted to the communication method/frequency band changing unit 406. Further, when it is determined to change the communication method, the communication method/frequency band determining unit 409 notifies the data communication unit 407 of the change contents of the communication method/frequency band.

The terminal status 410 is data in which a status related to the mobile terminal 400, such as a remaining battery charge, a current time point, and a current location of the mobile terminal 400, is described. The user action contents 411 are data in which actions (service contents, scheduled use time period, scheduled use rate, etc.) of the user are described, and generated through operational input made by the user on the mobile terminal 400. The terminal status 410 and the user action contents 411 are generated in the storage device provided to the mobile terminal 400.

The mobile terminal 400 has a hardware configuration as an information processing device (computer) provided with a CPU (processor), a storage device (memory) as a computer readable medium, an input/output device (I/O), a communication interface, a display device, an input device, and the like. With the CPU executing a computer program stored in the memory, the mobile terminal 400 implements the respective functional units illustrated in FIG. 5.

<Radio Wave Information Providing Unit>

Figure 6:
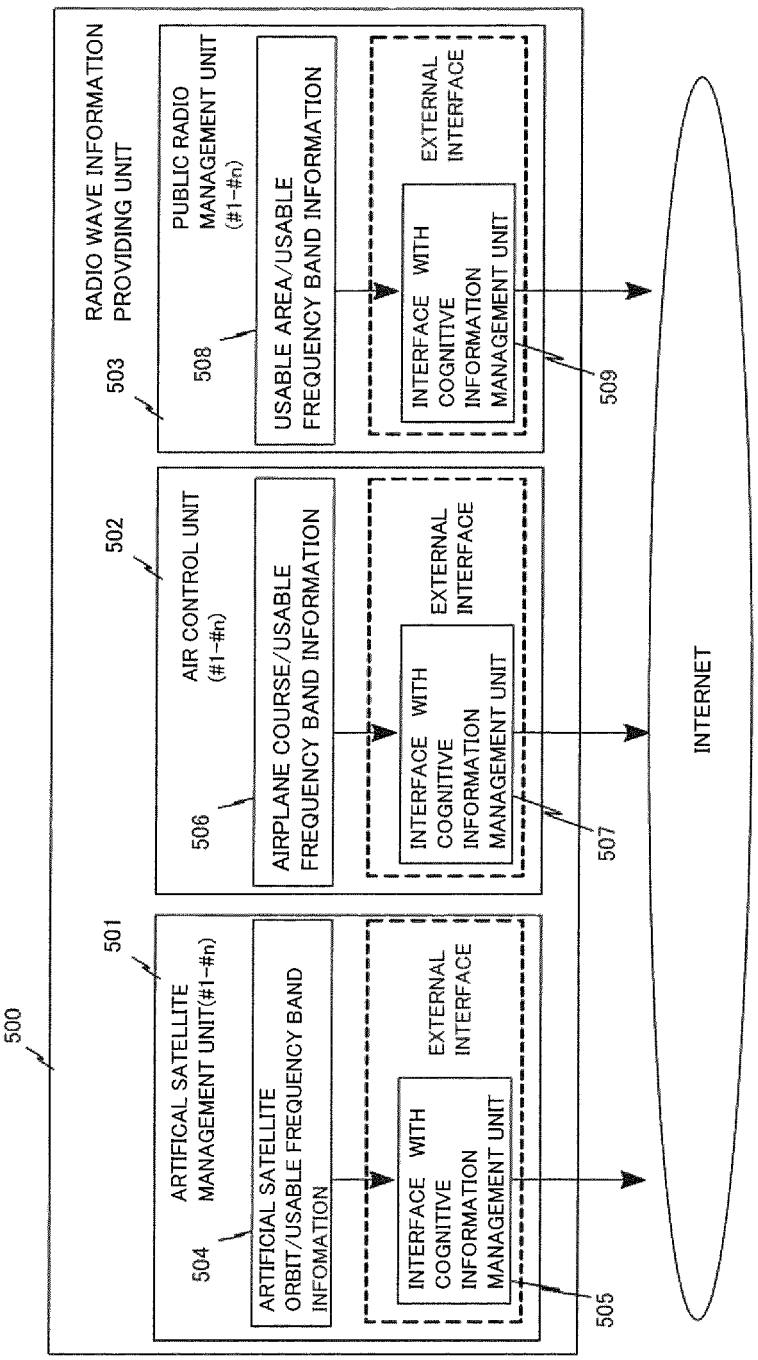
FIG. 6 is a diagram illustrating a functional block configuration example of a radio wave information providing unit illustrated in FIG. 2.

FIG. 6 is a diagram illustrating a functional block configuration example of the radio wave information providing unit 500 illustrated in FIG. 2. The radio wave information providing unit 500 includes n artificial satellite management units 501 (#1 to #n), n air control units 502 (#1 to #n), and n public radio management units 503 (#1 to #n).

The artificial satellite management unit 501 is a server that manages information acquired by an institution managing the orbits of artificial satellites, the radio wave use conditions thereof, etc. The air control unit 502 is a server that manages information acquired by an institution managing the courses of airplanes, the radio wave use conditions thereof, etc. The public radio management unit 503 is a server that manages information acquired by an institution managing the use location of the public radio and the radio wave use condition thereof.

Each of the artificial satellite management unit 501, the air control unit 502, and the public radio management unit 503 transmits (provides) a measured value and/or a predicted value of the radio wave use information managed therein to the cognitive information management unit 200 via the Internet.

The artificial satellite management unit 501 includes an IF for cognitive information management unit 505 for transmitting artificial satellite orbit/usable frequency band information 504 to the cognitive information management unit 200 via the Internet.

The artificial satellite orbit/usable frequency band information 504 is data in which information on the orbit and the usable frequency band of an artificial satellite that is under management of an artificial satellite management institution is recorded, and is stored in the storage device of the artificial satellite management unit 501.

The air control unit 502 includes an IF for cognitive information management unit 507 for transmitting airplane course/usable frequency band information 506 to the cognitive information management unit 200 via the Internet.

The airplane course/usable frequency band information 506 is data in which information on the course and the usable frequency band of an airplane that is under management of an air control institution is recorded, and is stored in the storage device of the air control unit 502.

The public radio unit 503 includes an IF for cognitive information management unit 509 for transmitting usable area/usable frequency band information 508 to the cognitive information management unit 200 via the Internet.

The usable area/usable frequency band information 508 is data in which information on the usable area and the usable frequency band of public radio that is under management of a public radio management institution is recorded, and is stored in the storage device of the public radio management unit 503.

[Operational Example (Processing Performed by Each Unit)]

Next, as an operational example (processing of each unit) of the cognitive information delivery system illustrated in FIG. 2, description is given of an operational example on the network side (cognitive information management unit 200, communication system 300, radio wave information providing unit 500) with respect to the mobile terminal 400. The operational example may be divided into the following five operations:

(operation 1) generation and transmission of information for generating a cognitive information table;
(operation 2) generation of a cognitive information table;
(operation 3) transmission of the initial beacon;
(operation 4) changing of the frequency band and the like based on the communication method/frequency band change information; and
(operation 5) provision of the detailed list to the mobile terminal.

Hereinafter, description is given of details of the above-mentioned operations 1 to 5.

<Operation 1: Generation and Transmission of Information for Generating Cognitive Information Table>

FIG. 7 is a sequence diagram illustrating processing of generating and transmitting information for generating a cognitive information table, which is performed in the cognitive information delivery system 100. In the processing, in order to generate the cognitive information table 210 (FIG. 3), the OAM information transmitting units 307 (FIGS. 2 and 4) of the communication systems 300 (#1 to #n) transmit the OAM information to the cognitive information management unit 200. Further, each of the artificial satellite management unit 501, the air control unit 502, and the public radio management unit 503 configuring the radio wave information providing unit 500 (FIG. 6) transmits information on the usable frequency band thereof and the like to the cognitive information management unit 200. Details thereof are described in the following procedures (1) to (4).

(Procedure (1))

In each of the plurality of communication systems 300 (in FIG. 7, the communication system #1 is illustrated as an example), the OAM information transmitting unit 307 (FIG. 4) of the OAM section (OAM information unit) 304 acquires the traffic information, the fault information, and the scheduled regulation information within the OAM information unit 304 (FIG. 7: S1), and then transmits the traffic information, the fault information, and the scheduled regulation information to the OAM information receiving unit 207 (FIG. 3) of the cognitive information management unit 200 (FIG. 7: S2).

For the transmission of the OAM information, it is possible to make a selection between arbitrary time points (timing) and regular time points (timing: for example, once an hour) (in this example, regularly). The OAM information receiving unit 207 receives/stores the OAM information (FIG. 7: S3).

FIG. 8 is a table illustrating a data format example of the OAM information transmitted from the OAM information transmitting unit 307. In FIG. 8, there is illustrated the OAM information representing a case of the communication method #1 (for example, 3G), a transmission time point of 12:00, and a prediction time point of up to 14:00.

The OAM information contains the traffic information, the fault information, and the regulation information. The traffic information contains areas in which the communication method #1 can be used (areas A and B), and the measured value and the predicted value of the traffic usage rate at each time point in each area.

Further, the fault information contains information indicating whether or not there is any fault occurrence in the areas A and B in which the communication method #1 can be used and whether or not the communication method can be used. Further, the regulation information contains the measured value and the predicted value that indicate, for each time point, whether or not there is any regulation in each of the areas A and B.

(Procedure (2))

The artificial satellite management units 501 (#1 to #n: FIG. 6) of the radio wave information providing unit 500 acquire information on the orbits, the frequency bands of used radio waves, the requested detuning bandwidths (gaps), and the allowable radio wave strengths of the artificial satellites managed by the artificial satellite management unit 501 (S4 in FIG. 7), and then transmits, as the artificial satellite orbit/usable frequency band information, the acquired information to the scheduled radio wave use information receiving unit 208 of the cognitive information management unit 200 (S5 in FIG. 7). For the transmission timing, it is possible to make a selection between arbitrary time points (timing) and regular time points (timing: for example, once an hour) (in this example, regularly). The scheduled radio wave use information receiving unit 208 receives/stores the artificial satellite orbit/usable frequency band information (S6 in FIG. 7).

FIG. 9 is a table illustrating a data format example of the artificial satellite orbit/usable frequency band information transmitted from the artificial satellite management unit 501. In FIG. 9, there is illustrated the artificial satellite orbit/usable frequency band information representing a case of the artificial satellite management unit #1 as a transmission source, a transmission time point of 12:00, and a prediction time point of up to 14:00.

In the example illustrated in FIG. 9, the artificial satellite orbit/usable frequency band information contains, for each of three time points (time points are expressed by the hour) with regard to one or more areas over which an artificial satellite managed by the artificial satellite management unit 501 of the transmission source passes, an identifier, a usable frequency band, a detuning bandwidth, and an allowable radio wave strength of the artificial satellite passing in the sky.

(Procedure (3))

The air control units 502 (#1 to #n) of the radio wave information providing unit 500 acquire information on the courses, the frequency bands of used radio waves, the requested detuning bandwidths (gaps), and the allowable radio wave strengths of the airplanes managed by the air control unit 502 (S7 in FIG. 7), and then transmits, as the airplane course/usable frequency band information, the acquired information to the scheduled radio wave use information receiving unit 208 of the cognitive information management unit 200 (S8 in FIG. 7). For the transmission time points (timing), it is possible to make a selection between arbitrary timing and regular timing (for example, once an hour) (in this example, regularly). The scheduled radio wave use information receiving unit 208 receives/stores the airplane course/usable frequency band information (S9 in FIG. 7).

FIG. 10 is a table illustrating a data format example of the airplane course/usable frequency band information transmitted from the air control unit 502. In FIG. 10, there is illustrated the airplane course/usable frequency band information representing a case of the air control unit #1 as a transmission source, a transmission time point of 12:00, and a prediction time point of up to 14:00 (time points are expressed by the hour).

As illustrated in FIG. 10, the parameters contained in the airplane course/usable frequency band information are similar to those of the artificial satellite orbit/usable frequency band information (FIG. 9) except for the identification information of the airplane.

(Procedure (4))

The public radio management units 503 (#1 to #n) of the radio wave information providing unit 500 acquire information on the areas, the frequency bands of used radio waves, the requested detuning bandwidths (gaps), and the allowable radio wave strengths of the public radio managed by the public radio management unit 503 (S10 in FIG. 7), and then transmits, as the usable area/usable frequency band information, the acquired information to the scheduled radio wave use information receiving unit 208 of the cognitive information management unit 200 (S11 in FIG. 7). For the transmission time points (transmission timing), it is possible to make a selection between arbitrary timing and regular timing (for example, once an hour) (in this example, regularly). The scheduled radio wave use information receiving unit 208 receives/stores the usable area/usable frequency band information (S12 in FIG. 7).

FIG. 11 is a table illustrating a data format example of the usable area/usable frequency band information transmitted from the public radio management unit 503. In FIG. 11, there is illustrated the usable area/usable frequency band information representing a case of the public radio management unit #1 as a transmission source, a transmission time point of 12:00, and a prediction time point of up to 14:00 (time points are expressed by the hour).

As illustrated in FIG. 11, the parameters contained in the usable area/usable frequency band information are similar to those of the artificial satellite orbit/usable frequency band information (FIG. 9) except for the use information (identifier of public radio).

<Operation 2: Generation of Cognitive Information Table>

The cognitive information table generating unit 209 (FIG. 3) of the cognitive information management unit 200 generates the cognitive information table 210 based on the information stored in the OAM information receiving unit 207 and the scheduled radio wave use information receiving unit 208, and the variable frequency band information and the fixed frequency band information previously stored in the tables 211 and 212. Specific processing is described in the following procedures (1) and (2).

(Procedure (1))

The cognitive information table generating unit 209 of the cognitive information management unit 200 acquires the artificial satellite orbit/usable frequency band information, the airplane course/usable frequency band information, and the usable area/usable frequency band information stored in the OAM information receiving unit 207 and the scheduled radio wave use information receiving unit 208, and the variable frequency band information and the fixed frequency band information previously stored in the tables 211 and 212. The acquisition time points (timing) may be set arbitrarily or regularly. For example, the acquisition timing is set to occur once an hour.

FIG. 12 is a table illustrating a data format example of the variable frequency band information (table 211), whereas FIG. 13 is a table illustrating a data format example of the fixed frequency band information (table 212).

As illustrated in FIG. 12, in the table 211, as the variable frequency band information for each of the communication methods #1 to #n, there is stored information indicating an available area, a band number, a frequency band corresponding to the band number, a minimum bandwidth, a unit bandwidth, a detuning bandwidth, and a minimum transmission strength.

Further, as illustrated in FIG. 13, in the table 212, as the fixed frequency band information for each of the communication methods #1 to #n, there is stored information indicating an available area, a band number, a frequency band corresponding to the band number, an initial beacon frequency, and a detuning bandwidth.

(Procedure (2))

The cognitive information table generating unit 209 of the cognitive information management unit 200 uses the data acquired in the above-mentioned procedure (1) to generate the cognitive information table 210. The generation time point may be set arbitrarily or regularly. For example, a configuration in which the table 210 is generated once an hour may be employed.

An example of the procedures in which the cognitive information table 210 is generated by the cognitive information table generating unit 209 is described in the following steps <1> to <15>.

<1> First, the cognitive information table generating unit 209 generates an empty cognitive information table 210.

<2> Next, the cognitive information table generating unit 209 reads information on an initial time and an initial area of one of the plurality of communication methods (for example, communication method #1).

<3> Next, the cognitive information table generating unit 209 applies (writes) values of the fixed frequency band information to the cognitive information table 210.

<4> Next, the cognitive information table generating unit 209 applies (writes) values of the OAM information to the cognitive information table 210.

<5> In the above-mentioned step <4>, when the OAM information contains the fault information or the regulation information regarding the communication method in processing (communication method #1), the cognitive information table generating unit 209 generates the table 210 such that the communication method #1 is not allocated with a variable frequency band.

<6> Next, the cognitive information table generating unit 209 applies (writes) values of the variable frequency band information to the cognitive information table 210.

<7> The cognitive information table generating unit 209 carries out the processing of the above-mentioned steps <1> to <6> for all of the other communication methods #2 to #n.

<8> After the processing of the step <7> is finished, when there is a portion in which the frequency bands overlap each other among the communication methods, the cognitive information table generating unit 209 compares the values of the traffic information (contained in the OAM information) between the communication methods having the overlapping portion, and then allocates a broader frequency band to the communication method having the higher traffic usage rate.

On this occasion, the cognitive information table generating unit 209 performs such allocation that is compliant with a range defined by the minimum bandwidth, the unit bandwidth, and the detuning bandwidth (FIG. 12) previously stored in the table 211. When there occurs a surplus of band, the cognitive information table generating unit 209 treats the surplus band as the detuning bandwidth. The calculation related to such allocation is defined as "frequency allocation calculation 1". The details of the frequency allocation calculation 1 are described later.

<9> The cognitive information table generating unit 209 checks whether or not the frequency band used in the artificial satellite orbit/usable frequency band information is used in the cognitive information table 210.

<10> When it is judged in the step <9> that the frequency band is used, the cognitive information table generating unit 209 compares the minimum transmission strength (FIG. 12) and the allowable radio wave strength (FIG. 9) with regard to the portion in which the frequency bands overlap each other.

On this occasion, in a case of "minimum transmission strength<allowable radio wave strength", the cognitive information table generating unit 209 enters the value of that allowable radio wave strength as the allowable radio wave strength of the cognitive information table 210.

On the other hand, in a case of "minimum transmission strength>allowable radio wave strength", the cognitive information table generating unit 209 deletes that frequency band from the cognitive information table 210.

On this occasion, the cognitive information table generating unit 209 performs such allocation that is compliant with a range previously defined with regard to the values of the minimum bandwidth, the unit bandwidth, and the detuning bandwidth. The calculation related to such allocation is defined as "frequency allocation calculation 2". The details of the frequency allocation calculation 2 are described later.

<11> Next, the cognitive information table generating unit 209 checks whether or not the frequency band used in the airplane course/usable frequency band information is used in the cognitive information table 210.

<12> When it is judged in the step <11> that the frequency band is used, the generating unit 209 compares the minimum transmission strength (FIG. 12) and the allowable radio wave strength (FIG. 10) with regard to the portion of overlapping.

On this occasion, in a case of "minimum transmission strength<allowable radio wave strength", the cognitive information table generating unit 209 enters the value of that allowable radio wave strength as the allowable radio wave strength of the cognitive information table 210. On the other hand, in a case of "minimum transmission strength>allowable radio wave strength", the cognitive information table generating unit 209 deletes that frequency band from the cognitive information table 210. On this occasion, the cognitive information table generating unit 209 performs such allocation in a previously defined range that is compliant with the values of the minimum bandwidth, the unit bandwidth, and the detuning bandwidth (frequency allocation calculation 2).

<13> Next, the cognitive information table generating unit 209 checks whether or not the frequency band used in the usable area/usable frequency band information is used in the cognitive information table 210.

<14> When it is judged in the step <13> that the frequency band is used, the cognitive information table generating unit 209 compares the minimum transmission strength (FIG. 12) and the allowable radio wave strength (FIG. 11) with regard to the portion of overlapping.

On this occasion, in a case of "minimum transmission strength<allowable radio wave strength", the cognitive information table generating unit 209 enters the value of that allowable radio wave strength as the allowable radio wave strength of the cognitive information table 210.

On the other hand, in a case of "minimum transmission strength>allowable radio wave strength", the cognitive information table generating unit 209 deletes that frequency band from the cognitive information table 210.

On this occasion, the cognitive information table generating unit 209 performs such allocation in a previously defined range that is compliant with the values of the minimum bandwidth, the unit bandwidth, and the detuning bandwidth (frequency allocation calculation 2).

<15> The cognitive information table generating unit 209 performs the processing of the above-mentioned <2> to <14> for each area and each time (time point).

<<Details of Frequency Allocation Calculation 1>>

The frequency allocation calculation 1 is calculation performed in a case where two or more frequency bands overlap each other. As an example, description is given of a calculation method used in a case where the frequency bands of two different communication methods (communication methods A and B) overlap each other.

For example, parameters of the communication method A are defined as follows:
variable frequency band: Ka to Kb (Hz);
minimum bandwidth: S (Hz);
unit bandwidth: T (Hz);
detuning bandwidth: R (Hz); and
traffic usage rate: F (%).

Further, parameters of the communication method B are defined as follows:
variable frequency band: K'a to K'b (Hz);
minimum bandwidth: S' (Hz);
unit bandwidth: T' (Hz);
detuning bandwidth: R' (Hz); and
traffic usage rate: F' (%).

Figure 14:
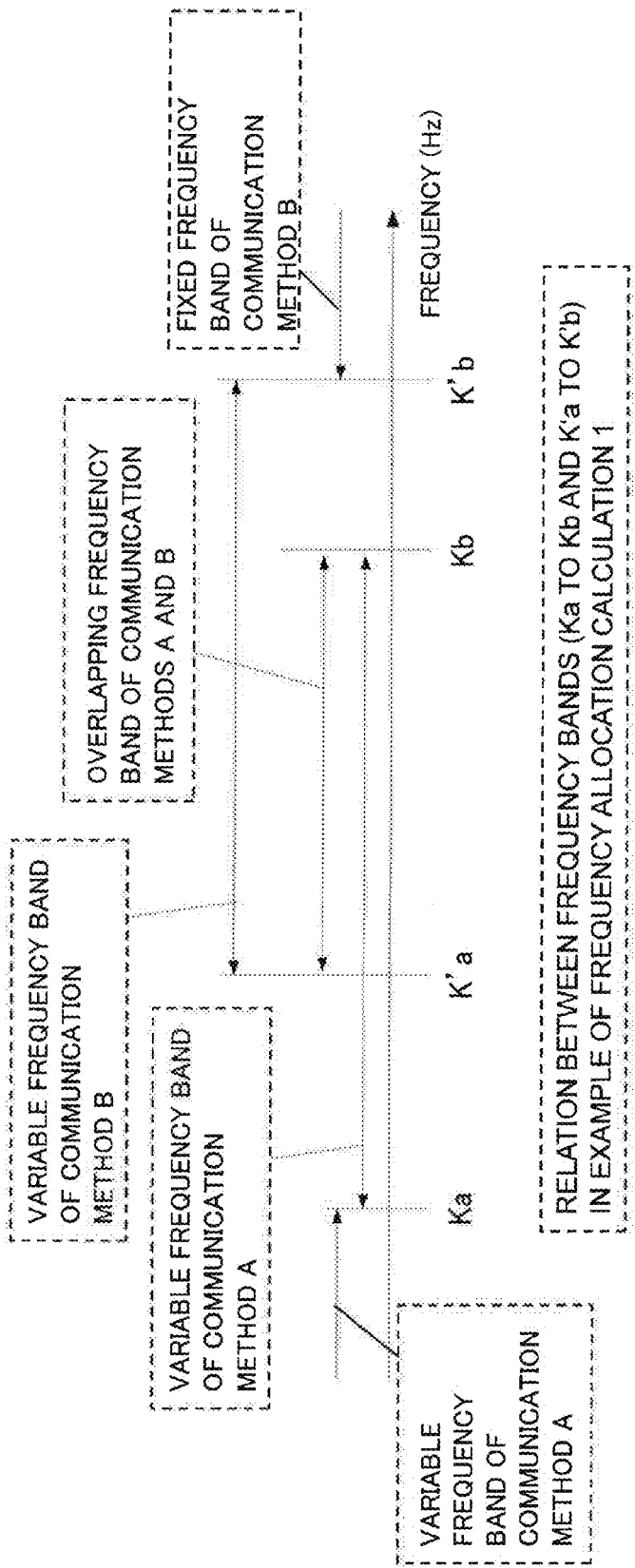
FIG. 14 is a diagram illustrating a relation between frequency bands (Ka to Kb and K'a to K'b) in an example of frequency allocation calculation 1.

The relation between the frequency bands (Ka to Kb and K'a to K'b) is assumed to have such a relation as illustrated in FIG. 14. In the example illustrated in FIG. 14, the overlapping frequency band is Kb−K'a. Here, a definition of Kb−K'a=I is given.

A detuning bandwidth to be used here is R in a case of R>R', and R' in a case of R<R'. Further, in a case of R=R', R is defined as the detuning bandwidth. In this example, the detuning bandwidth is set to R.

In the frequency allocation calculation 1, a communication method having the higher traffic usage rate is allocated with a broader frequency band. Thus, after the detuning bandwidth is secured from the overlapping frequencies, by using the ratios of the respective traffic usage rates, the respective frequency bands are set as follows.

Frequency band of communication method A: $(I-R)*F/(F+F')$

Frequency band of communication method B: $(I-R)*F'/(F+F')$

On this occasion, $(I-R)*F/(F+F')>S$ and $(I-R)*F'/(F+F')>S'$ need to be satisfied as the requirements.

Further, the frequency band is expressed by "minimum band +integral multiple of unit band", and hence, by defining $((I-R)*F/(F+F')-S) \div T$ as an integer J, the end point of the variable frequency band of the communication method A is expressed by K'a+S+JT.

Figure 15:
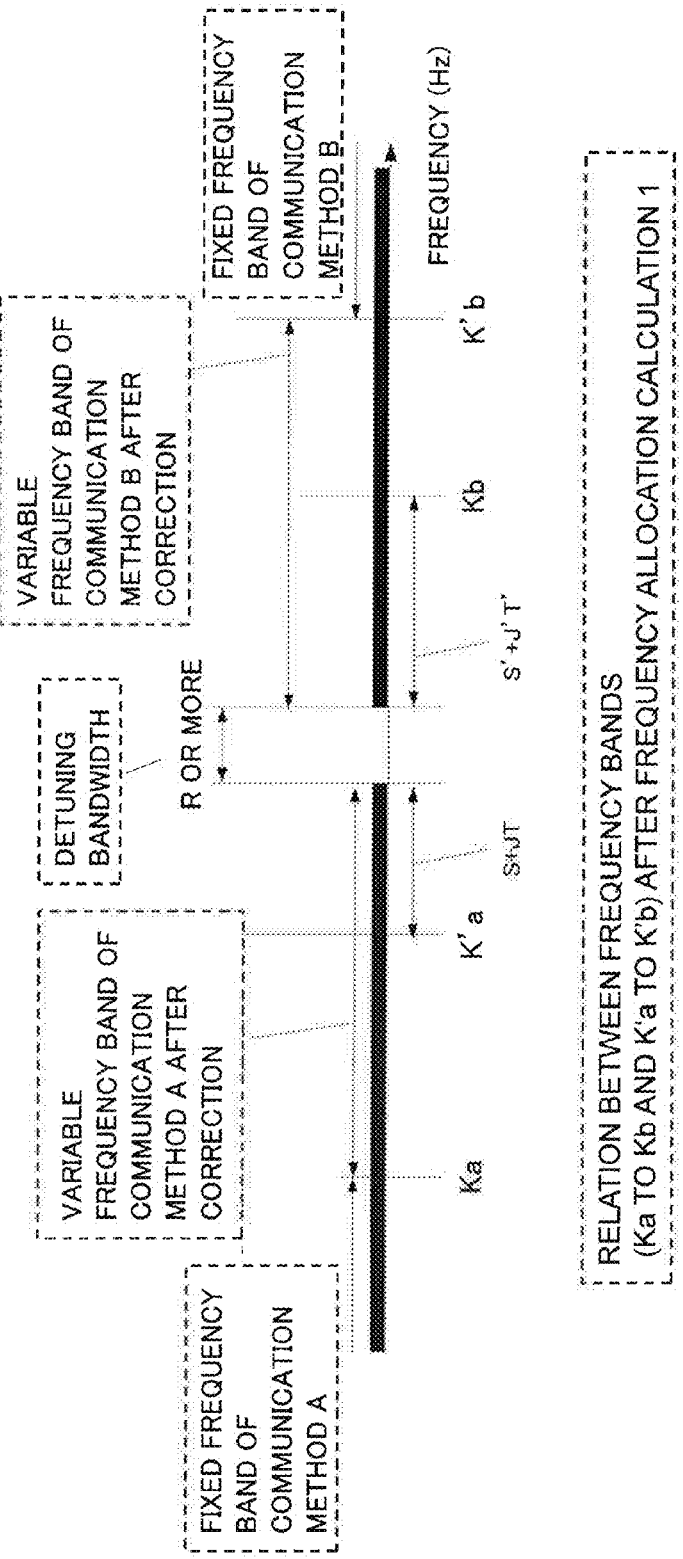
FIG. 15 is a diagram illustrating a relation between frequency bands adjusted through the frequency allocation calculation 1.

Similarly, with regard to the communication method B, by defining $((I-R)*F/(F+F')-S') \div T'$ as an integer J', the start point of the variable frequency band of the communication method B is expressed by Kb−(S'+J'T'). Accordingly, the respective frequency bands of the communication methods A and B can be illustrated as in FIG. 15.

Figure 16:
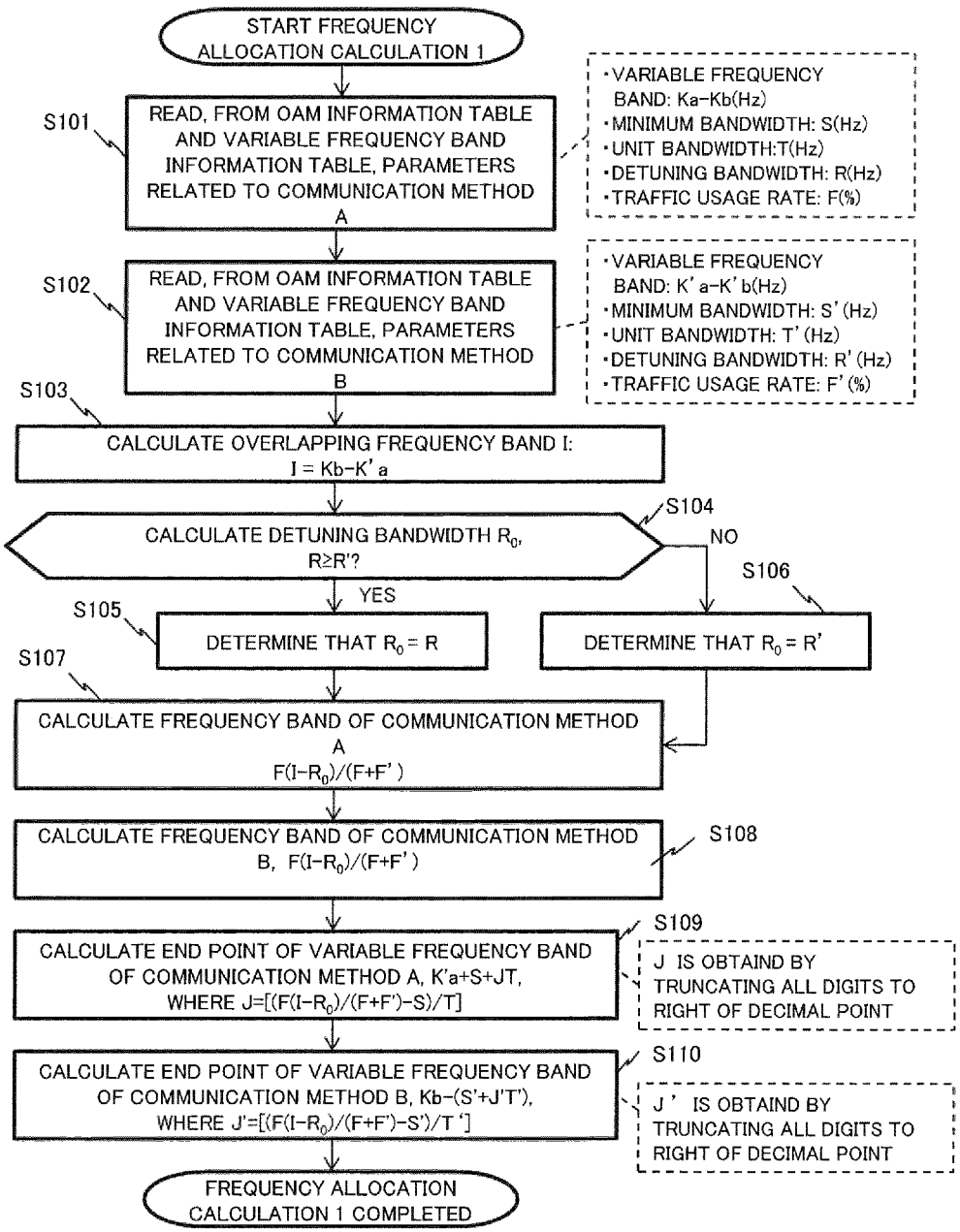
FIG. 16 is a flow chart illustrating an example of processing performed by a generating unit 209, which is related to the frequency allocation calculation 1.

FIG. 16 is a flow chart illustrating an example of processing performed by the cognitive information table generating unit 209, which is related to the frequency allocation calculation 1. In FIG. 16, when the frequency allocation calculation 1 is started, first, the cognitive information table generating unit 209 reads parameters related to the communication method A from the OAM information table (OAM information stored in the receiving unit 207) and the variable frequency band information table 211 (Step S101).

Next, the cognitive information table generating unit 209 reads parameters related to the communication method B from the OAM information table and the variable frequency band information table 211 (Step S102).

Next, the cognitive information table generating unit 209 calculates the overlapping frequency band I of the communication methods A and B (I=Kb−K'a) (Step S103).

Next, the cognitive information table generating unit 209 calculates a detuning bandwidth R0 to judge whether or not R≧R' (Step S104). On this occasion, when R≧R' is satisfied (YES of S104), the cognitive information table generating unit 209 determines that R0=R (Step S105). On the other hand, when R≧R' is not satisfied (NO of S104), the cognitive information table generating unit 209 determines that R0=R' (Step S106).

Next, the cognitive information table generating unit 209 calculates $F(I-R0)/(F+F')$ as the frequency band of the communication method A (Step S107). Subsequently, the cognitive information table generating unit 209 calculates $F'(I-R0)/(F+F')$ as the frequency band of the communication method B (Step S108).

Next, the cognitive information table generating unit 209 calculates K'a+S+JT (where $J=[(F(I-R0)/(F+F')-S)/T]$ and J is obtained by truncating all digits to the right of the decimal point) as the end point of the variable frequency band of the communication method A (Step S109).

Next, the cognitive information table generating unit 209 calculates Kb−(S'+J'T') (where J'=[(F(I−R0)/(F+F")−S')/T'] and J' is obtained by truncating all digits to the right of the decimal point) as the end point of the variable frequency band of the communication method B (Step S110), and finishes the frequency allocation calculation 1.

<<Details of Frequency Allocation Calculation 2>>

The frequency allocation calculation 2 is a calculation method used in a case where the usable frequency bands of the artificial satellite, the airplane, and the public radio overlap the frequency band of a given communication method, resulting in the necessity to delete the frequency band on the communication method side.

As an example, description is given of a calculation example used when the frequencies of the artificial satellite (may be airplane or public radio) overlap the frequency band of one of the communication methods (communication method A).

For example, parameters of the communication method A are defined as follows:
variable frequency band: Ka to Kb (Hz);
minimum bandwidth: S (Hz);
unit bandwidth: T (Hz); and
detuning bandwidth: R (Hz).

Further, parameters related to the artificial satellite are defined as follows:
usable frequency band: K'a to K'b (Hz); and
detuning bandwidth: R' (Hz).

The relation of the frequencies between the communication method A and the artificial satellite (Ka to Kb and K'a to K'b) is assumed to be as illustrated in FIG. 17. In this case, in consideration of a necessary detuning bandwidth R, the frequency band available for the communication method A is K'a−Ka−R. On this occasion, it is assumed that K'a−Ka−R=L. It should be noted that the detuning bandwidth is R in the case of R>R', and R' in the case of R<R'. Further, in the case of R=R', R is defined as the detuning bandwidth. Here, the detuning bandwidth is set to R.

In this case, there is a need to take into account the minimum bandwidth and the unit bandwidth of the communication method A and the detuning bandwidth between the communication method A and the artificial satellite. Accordingly, "L>S" needs to be satisfied as the requirement. Further, in this case, "(L−S)÷T" is defined as an integer M. The end point of the variable frequency band of the communication method A in this case is expressed as "Ka+S+MT". Thus, the respective frequency bands of the communication method A and the artificial satellite can be illustrated as in FIG. 18.

It should be noted that, as described above, the frequency allocation calculation 2 is also applicable to a case in which the usable frequency band of the airplane or the usable frequency band of the public radio overlaps the usable frequency band of a given communication method.

FIG. 19 is a flow chart illustrating an example of processing performed by the cognitive information table generating unit 209, which is related to the frequency allocation calculation 2. In FIG. 19, when the frequency allocation calculation 2 is started, the cognitive information table generating unit 209 reads parameters related to the communication method A from the variable frequency band information table 211 (Step S121).

Next, the cognitive information table generating unit 209 reads the parameters related to the artificial satellite from the artificial satellite orbit/usable frequency band information table (artificial satellite orbit/usable frequency band information stored in the receiving unit 207) (Step S122). In this example, there is illustrated an example in which the usable frequency bands are adjusted between the artificial satellite and the communication method. In a case of the airplane or the public radio as an adjustment target, the parameters of the airplane or the public radio, which are related to the adjustment target, are read in Step S122.

Next, the cognitive information table generating unit 209 calculates a detuning bandwidth RO to judge whether or not R≧R' (Step S123). On this occasion, when R≧R' is satisfied (S123: YES), the cognitive information table generating unit 209 determines that R0=R (Step S124). On the other hand, when R≧R' is not satisfied (S123: NO), the cognitive information table generating unit 209 determines that R0=R' (Step S125).

Next, the cognitive information table generating unit 209 calculates L=K'a−Ka−R0 as the frequency band L available for the communication method A (Step S126). Subsequently, the cognitive information table generating unit 209 calculates F(I−R0)/(F+F') as the frequency band of the communication method A (Step S127).

Next, the cognitive information table generating unit 209 calculates Ka+S+MT (where M=[(L−S)/T] and M is obtained by truncating all digits to the right of the decimal point) as the end point of the variable frequency band of the communication method A (Step S128), and finishes the frequency allocation calculation 2.

<<Example of Cognitive Information Table>>

FIG. 20 is a table illustrating a data format example of the cognitive information table 210. It should be noted that the example illustrated in FIG. 20 shows a case in which the generation time point is 12:00 and the prediction time point is up to 14:00 (unit time is one hour).

In the cognitive information table 210, with regard to each of the communication methods #1 to #n, there is registered cognitive information including an available area, a beacon frequency, a time point (measured and predicted), a band number, a frequency band, an allowable radio wave strength, traffic information, fault information, and regulation information.

<<Sequence and Flow Chart of Cognitive Information Table Generation>>

Figure 22:
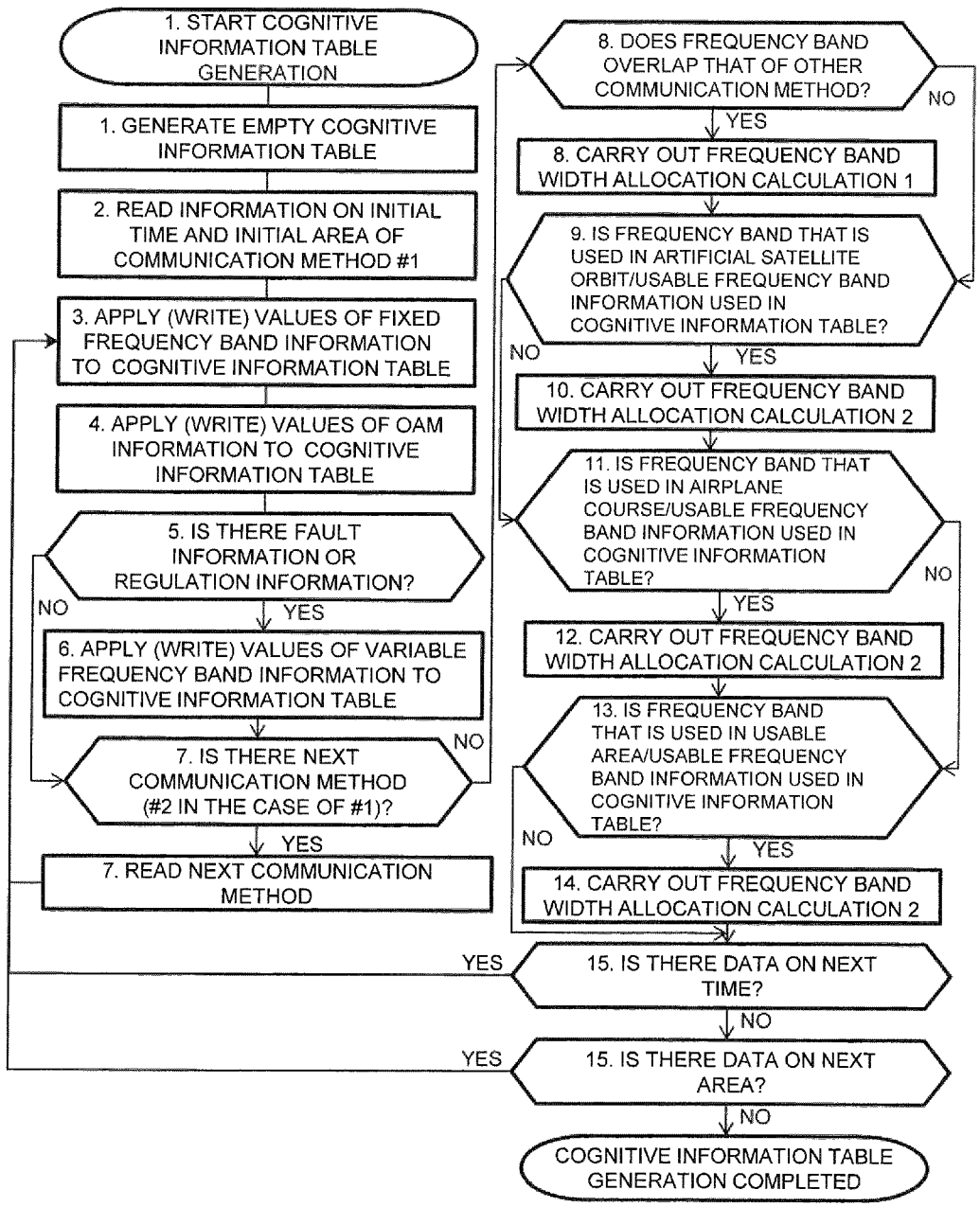
FIG. 22 is a flow chart illustrating an example of processing related to cognitive information generation.

FIG. 21 is a sequence diagram illustrating an example of cognitive information table generation, and FIG. 22 is a flow chart illustrating an example of processing related to the cognitive information generation.

In FIG. 21, the OAM information receiving unit 207 of the cognitive information management unit 200 reads the OAM information that has been stored after being received from the respective communication systems (methods) #1 to #n (S21), and then transmits the OAM information to the cognitive information table generating unit 209 (S22). The cognitive information table generating unit 209 receives the OAM information and stores the OAM information therein (S23).

Further, the scheduled radio wave use information receiving unit 208 reads the radio wave information (artificial satellite orbit/usable frequency band information, airplane course/usable frequency band information, and usable area/usable frequency band information) that has been stored after being received from the radio wave information providing unit 500 (S24), and then transmits the radio wave information to the cognitive information table generating unit 209 (S25). The cognitive information table generating unit 209 receives the radio wave information and stores the radio wave information therein (S26).

Subsequently, the cognitive information table generating unit 209 reads the variable frequency band information and the fixed frequency band information stored within the tables 211 and 212, respectively (S27). After that, the processing of the flow chart illustrated in FIG. 22 is started. The numbers assigned to the respective blocks of the flow chart illustrated in FIG. 22 correspond with the above-mentioned steps <1> to <15>. Hence, detailed description of the flow chart is omitted.

It should be noted that, as the frequency allocation calculation 1 (step <8>), the processing illustrated in FIG. 16 is executed. Further, as the frequency allocation calculation 2 (steps <10>, <12>, and <14>), the processing illustrated in FIG. 19 is executed.

<Operation 3: Initial Beacon Transmission by Communication Systems #1 to #n>

When the cognitive information table 210 has been generated, each of the communication systems 300 (#1 to #n) transmits the initial beacon to a communication area of its own management.

Specifically, the initial beacon generating unit 204 of the cognitive information management unit 200 generates the initial beacon information based on the registered contents of the cognitive information table 210, and then transmits the initial beacon information to each of the communication systems 300 (#1 to #n).

Each of the communication systems 300 determines an initial beacon transmitting frequency based on the initial beacon information received from the cognitive information management unit 200, and then transmits this initial beacon information with a frequency determined for the mobile terminal 400. To give more details, the following procedures (1) and (2) are performed.

(Procedure (1))

The initial beacon generating unit 204 (FIG. 3) of the cognitive information management unit 200 generates the initial beacon information based on the cognitive information table 210, and then transmits the initial beacon information to the communication systems 300 (#1 to #n).

FIG. 23 is a table illustrating a data format example of the initial beacon information. The generation time point of the initial beacon information illustrated in FIG. 23 indicates, as an example, a case of 12:00. The initial beacon information contains an available area and a beacon frequency with regard to each of the communication methods #1 to #n.

(Procedure (2))

In each of the communication systems 300 (FIG. 4) that have received the initial beacon information, the initial beacon transmitting unit 308 extracts an area, to which the initial beacon transmitting unit 308 desires to transmit the initial beacon, from entries corresponding to its own communication method in the initial beacon information (FIG. 23), and then transmits the initial beacon toward the mobile terminal 400 with a beacon frequency corresponding to that area.

To give an example of the frequency for the initial beacon transmission, in a case of the generation time point of 12:00, the communication method #1, and the area A, the initial beacon frequency is set to 2601 MHz (see FIG. 23).

FIG. 24 is a table illustrating an example of an initial beacon to be transmitted toward the mobile terminal 400 located in the area A. The generation time point of the initial beacon illustrated in FIG. 24 is 12:00.

<<Sequence of Initial Beacon Transmission>>

Figure 25:
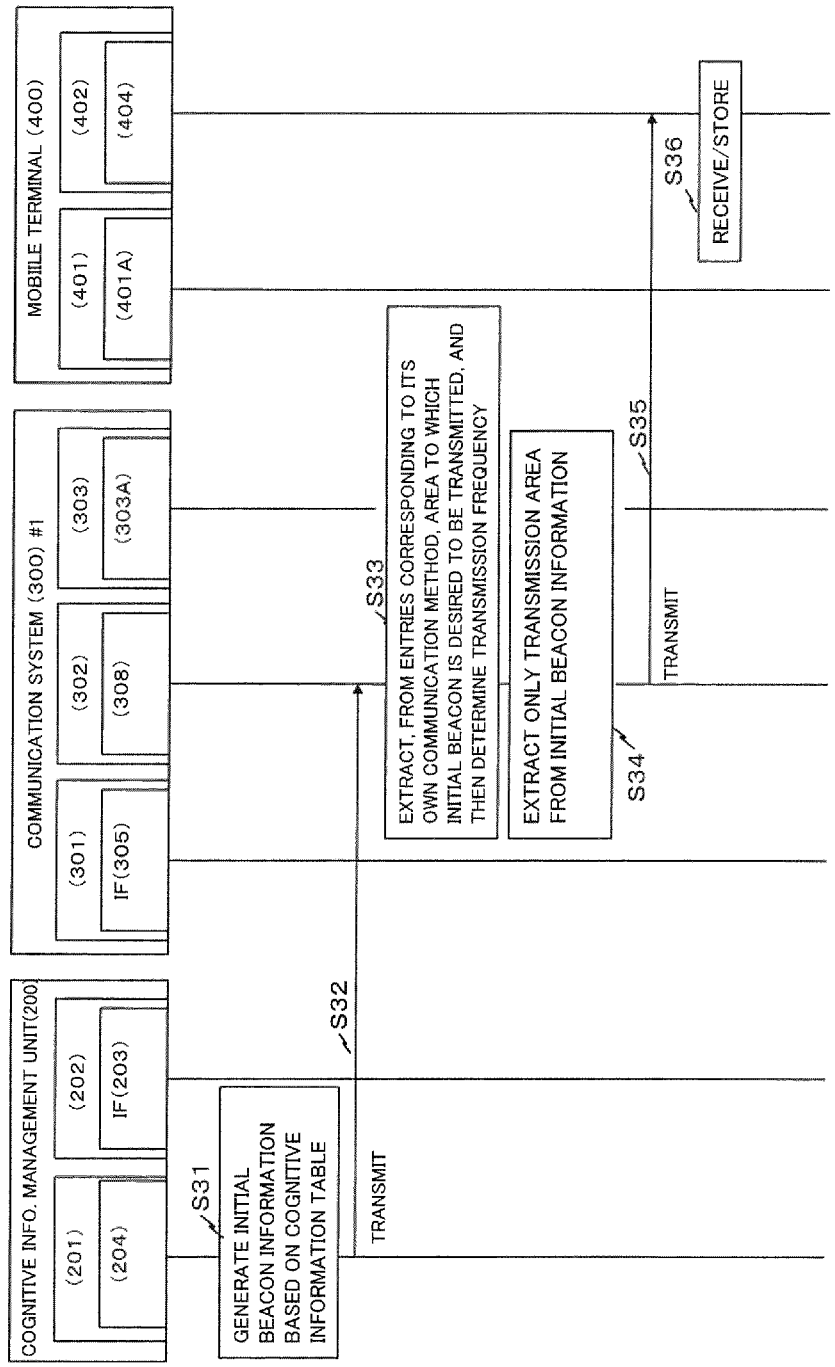
FIG. 25 is a sequence diagram illustrating an operational example of procedures related to initial beacon transmission.

FIG. 25 is a sequence diagram illustrating an operational example of the above-mentioned procedures (1) and (2) related to the initial beacon transmission. In FIG. 25, the initial beacon generating unit 204 of the cognitive information management unit 200 generates the initial beacon information based on the cognitive information table 210 (S31), and then transmits the initial beacon information to the respective communication systems 300 (#1 to #n) (S32).

Upon reception of the initial beacon information, the initial beacon transmitting unit 308 of the communication systems 300 (for example, #1) extracts a beacon frequency of the area to which the initial beacon is to be transmitted (for example, area A) from entries corresponding to its own communication method (communication method #1) in the initial beacon information (FIG. 23), and then determines the transmission frequency for the initial beacon (S33).

Subsequently, the initial beacon transmitting unit 308 extracts, from the initial beacon information, only information on the transmission area (area A) (S34), and then transmits the initial beacon to the mobile terminal 400 with the determined transmission frequency (S35).

In the mobile terminal 400, the initial beacon receiving unit 404 receives the initial beacon via the radio processing unit 401A and stores the initial beacon therein (S36).

<Operation 4: Changing of Frequency Band and the Like Based on Communication Method/Frequency Band Change Information>

In an operation 4, the communication method/frequency band determining unit 206 of the cognitive information management unit 200 generates the communication method/frequency band change information for the communication systems 300 (#1 to #n) based on the cognitive information table 210, and then transmits the communication method/frequency band change information to the communication method/frequency band changing unit 309 of each of the communication systems 300.

The communication method/frequency band changing unit 309 that has received the communication method/frequency band change information sets, based on the communication method/frequency band change information, the frequency band and the allowable radio wave strength determined for each area for the radio processing unit 303A. Detailed procedures are described in the following (1) and (2).

(Procedure (1))

The communication method/frequency band determining unit 206 (FIG. 3) of the cognitive information management unit 200 refers to the cognitive information table 210 to generate the communication method/frequency band change information for the respective communication systems 300 (#1 to #n).

FIG. 26 illustrates a data format example of the communication method/frequency band change information. The example illustrated in FIG. 26 represents a case of the communication method#1, and the generation time point of 12:00.

The communication method/frequency band change information contains, with regard to each of the available areas of the communication method, a designated time point, a band number, a frequency band, and an allowable radio wave strength. Those pieces of information can be generated by extracting information from the cognitive information table 210.

(Procedure (2))

The communication method/frequency band changing unit 309 of each of the communication systems 300 (#1 to #n) that have received the communication method/frequency band change information sets, based on the communication method/frequency band change information, the frequency band and the allowable radio wave strength determined for each area for the radio processing unit 303A.

<<Sequence>>

Figure 27:
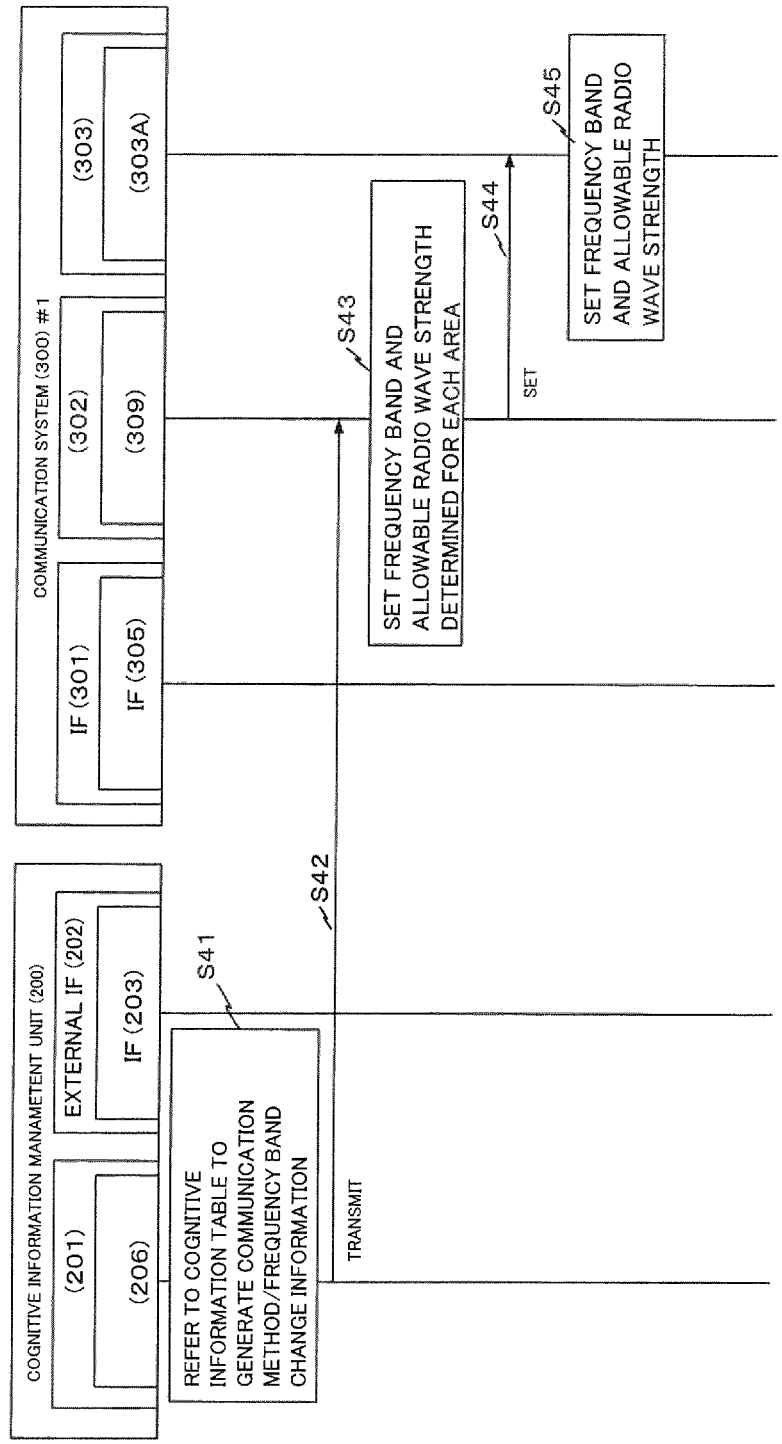

FIG. 27 is a sequence diagram illustrating an operational example of the procedures (1) and (2) related to the communication method/frequency band changing. In FIG. 27, the communication method/frequency band determining unit 206 of the cognitive information management unit 200 refers to the cognitive information table 210 to generate the communication method/frequency band change information (FIG. 26) (S41), and then transmits the communication method/frequency band change information to each of the communication systems 300 (#1 to #n) (S42).

The communication method/frequency band changing unit 309 of the communication method 300 (for example, #1) sets, based on the communication method/frequency band change information, the frequency band and the allowable radio wave strength determined for each area for the radio processing unit 303A (S43, S44, and S45).

<Operation 5: Transmission of Detailed List in Response to Request from Mobile Terminal>

When a request (request list) for a detailed list has been made from the request list generating unit 408 (FIG. 5) of the mobile terminal 400, the detailed list generating unit 205 (FIG. 3) of the cognitive information management unit 200 receives the request list.

The detailed list generating unit 205 refers to the cognitive information table 210 to generate a detailed list, and then transmits the detailed list toward the detailed list receiving unit 405 of the mobile terminal 400. Detailed procedures are described in the following procedures (1) and (2).

(Procedure (1))

After a request list is generated by the request list generating unit 408 of the mobile terminal 400, the request list is transmitted from the radio processing unit 401A, and is then received, via the communication method 300 in communication, by the detailed list generating unit 205 of the cognitive information management unit 200.

FIG. 28 is a table illustrating a data format example of the request list. In the example illustrated in FIG. 28, the communication methods #1 and #2 are involved in the request for a detailed list. Parameters required to be contained in the detailed list are the frequency band, the traffic information, the fault information, and the regulation information. Further, the required area is the area A, and the acquisition time zone is between 12:00 and 13:00.

(Procedure (2))

In the cognitive information management unit 200 (FIG. 3), the request list received by the IF 203 is transferred to the detailed list generating unit 205. Based on the request list, the detailed list generating unit 205 generates a detailed list by referring to the cognitive information table 210.

The detailed list is generated, for example, with the use of such a method of generating a detailed list, in which only the necessary parameters contained in the request list are extracted from the cognitive information table 210, and then the extracted information is arranged in a table format.

The detailed list is transmitted from the detailed list generating unit 205 toward the detailed list receiving unit 405 of the mobile terminal 400. The detailed list is received, via the IF 203 and the communication system 300, by the radio processing unit 401A of the mobile terminal 400, and then transferred to the detailed list receiving unit 405.

FIG. 29 is a table illustrating a data format example of the detailed list. The detailed list of FIG. 29 is generated by extracting, from the cognitive information table 210 (FIG. 20), the necessary parameters contained in the request list illustrated in FIG. 28.

<<Sequence>>

Figure 30:
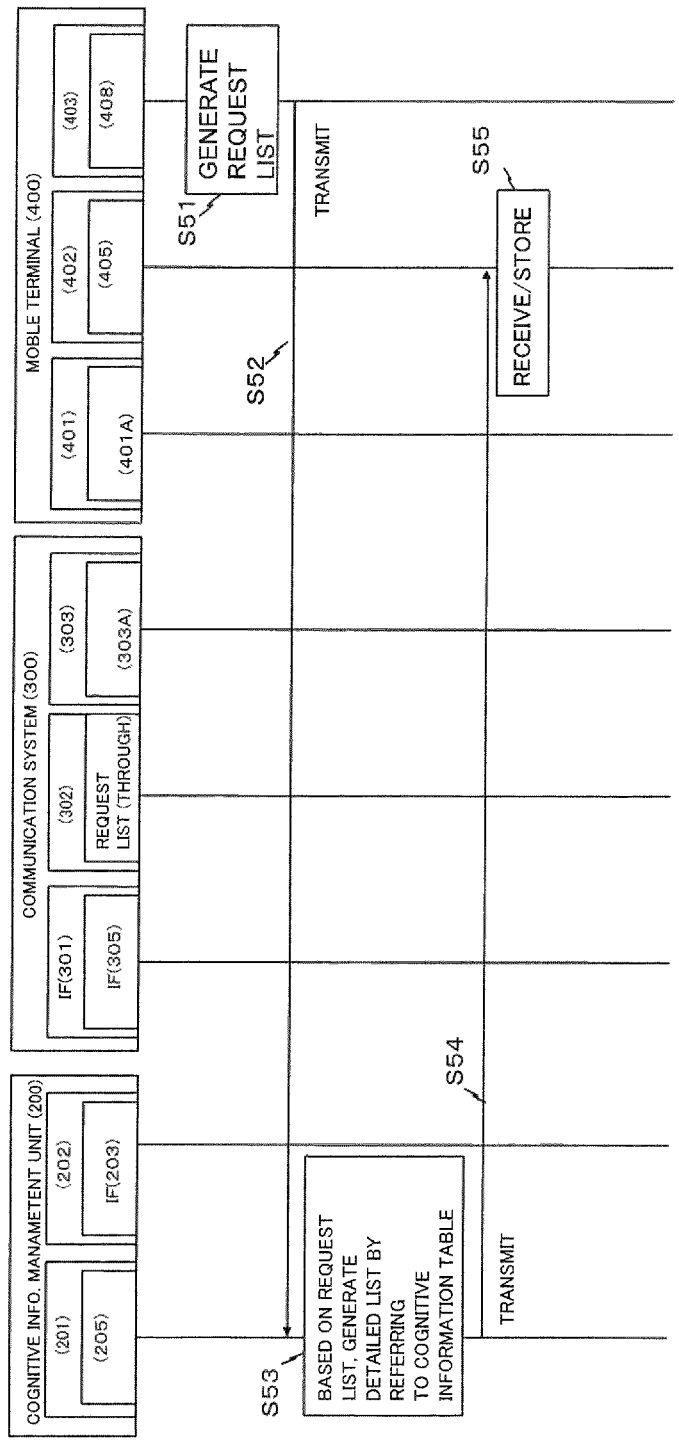
FIG. 30 is a sequence diagram illustrating an operational example related to transmission/reception of the request list and the detailed list.

FIG. 30 is a sequence diagram illustrating an operational example of the procedures (1) and (2) related to the transmission/reception of the request list and the detailed list described above. In FIG. 30, the request list generating unit 408 of the mobile terminal 400 generates a request list (S51), and then transmits the request list toward the detailed list generating unit 205 of the cognitive information management unit 200 (S52)

The request list is transmitted from the radio processing unit 401A, relayed by the communication system 300, and received by the IF for other communication method 203, to thereby reach the detailed list generating unit 205.

Based on the request list, the detailed list generating unit 205 generates a detailed list by referring to the cognitive information table 210 (S53). The detailed list is transmitted from the IF for other communication method 203, relayed by the communication system 300, and received by the radio processing unit 401A, to thereby reach the detailed list receiving unit 405 (S54). The detailed list receiving unit 405 receives the detailed list and stores the detailed list therein (S55). After that, in the mobile terminal 400, based on the detailed list, the communication method/frequency band is determined.

Effects of Embodiment

According to the cognitive information delivery system of the embodiment of the present invention, the cognitive information management unit 200 collects, from each of the communication systems (communication methods) #1 to #n, information on traffic, fault, regulation, and the like (OAM information). Further, the cognitive information management unit 200 collects, from the radio wave information providing unit 500, information regarding the artificial satellite, the airplane, and the public radio.

Further, the cognitive information management unit 200 generates the cognitive information table 210 by combining the collected information, the variable frequency band information, and the fixed frequency band information.

The cognitive information management unit 200 generates the initial beacon information based on the cognitive information table 210, and the initial beacon information is delivered to each of the communication systems of the communication methods #1 to #n. The respective communication systems of the communication methods #1 to #n deliver the initial beacons based on the initial beacon information to the mobile terminals 400 under management thereof.

Further, the cognitive information management unit 200 determines the usable frequency band of each of the communication systems of the communication methods #1 to #n based on the cognitive information table 210, and then delivers the communication method/usable frequency band information to the respective communication systems of the communication methods #1 to #n. With this, each of the communication systems of the communication methods #1 to #n changes the frequency band so as to perform wireless communication with a frequency band determined based on the cognitive information table 210.

Further, the cognitive information management unit 200 generates the detailed list corresponding to the request list transmitted via the communication system 300 from the mobile terminal 400, and then provides the detailed list to the mobile terminal 400. By doing so, in the respective communication systems of the communication methods #1 to #n, it becomes possible to perform optimal allocation of frequency bands. In other words, it becomes possible to efficiently utilize frequencies among a plurality of communication methods.

[Detailed Description of Mobile Terminal]

Next, detailed description is added with regard to the above-mentioned processing and operation of the mobile terminal 400. The processing and operation of the mobile terminal 400 are classified into the following six operations:

(operation 1) reception of the initial beacon;
(operation 2) recognition of the surrounding radio wave condition and prioritization;
(operation 3) generation and transmission of the request list for making a request to the cognitive information management unit;
(operation 4) reception of the detailed list from the cognitive information management unit, and prioritization based thereon;
(operation 5) prioritization based on the terminal side status and user actions; and
(operation 6) determination of the communication method/frequency band, and changing of the communication method.

Further, the flow of the processing (processing method) performed by the mobile terminal 400 is largely divided into the following two methods of a method A and a method B:

(method A) a method in which, instead of the terminal itself collecting information necessary for the recognition, the network side collects and manages the information in an integrated manner, and the terminal performs the recognition by using that information; and
(method B) a hybrid method in which, in addition to the above-mentioned method, as the technology from the original cognitive radio technology, the terminal side also collects the information.

Figure 31:
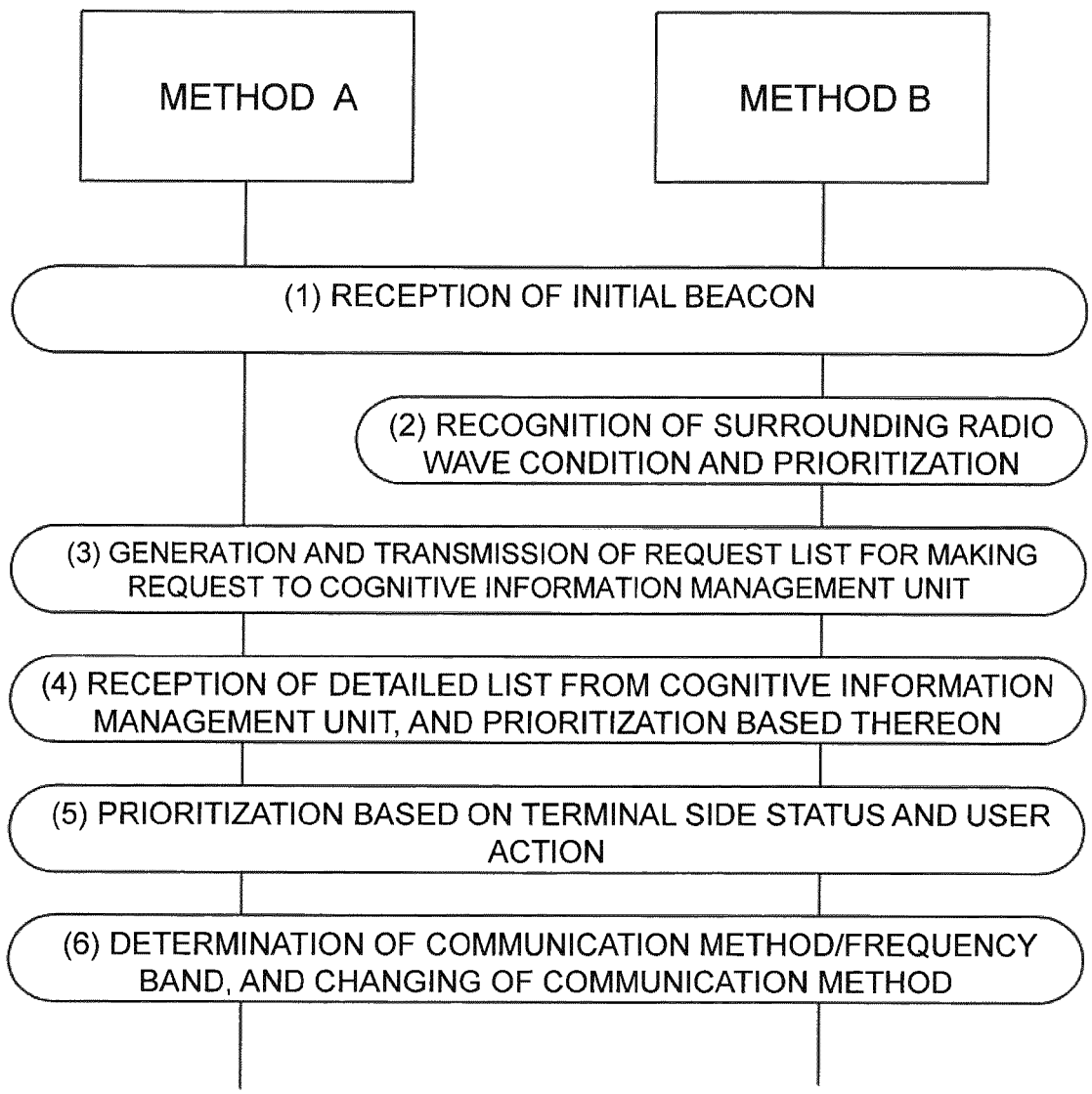
FIG. 31 is a flow chart briefly illustrating two operation methods (method A and method B) operable on the mobile terminal.

FIG. 31 is a flow chart briefly illustrating operations of the above-mentioned method A and method B. As illustrated in FIG. 31, the method B is different from the method A in that the above-mentioned operation 2 "recognition of the surrounding radio wave condition and prioritization" is added. Hereinafter, detailed description is given of the above-mentioned operations 1 to 6 according to the embodiment.

<Operation 1: Reception of Initial Beacon>

The initial beacon receiving unit 404 (FIG. 5) regularly receives the initial beacon transmitted by the initial beacon transmitting unit 308 of the communication system 300. Further, at the time of communication start and communication switching of the mobile terminal 400, when an acquisition request for the initial beacon is made from the request list generating unit 408, the initial beacon receiving unit 404 receives the initial beacon transmitted from the communication system 300 in response to the acquisition request, and then transmits the contents of the initial beacon to the request list generating unit 408. The detailed procedures are described in the following procedures (1) to (3).

(Procedure (1))

The initial beacon receiving unit 404 regularly (for example, once an hour) receives the initial beacon from each of the communication systems 300 (#1 to #n). The initial beacon is transmitted with a fixed frequency corresponding to each of the communication systems 300 (#1 to #n).

(Procedure (2))

Further, in the mobile terminal 400, when a communication is started or switched, the request list generating unit 408 makes an initial beacon acquisition request to the initial beacon receiving unit 404.

(Procedure (3))

The initial beacon receiving unit 404 that has received the initial beacon acquisition request from the request list generating unit 408 receives the initial beacon transmitted from the initial beacon transmitting unit 308 of the communication method 300.

FIG. 32 is a table illustrating an example of the initial beacon received by the mobile terminal 400. FIG. 32 illustrates an initial beacon for the area A, which has an initial beacon generation time point of 12:00.

Figure 33:
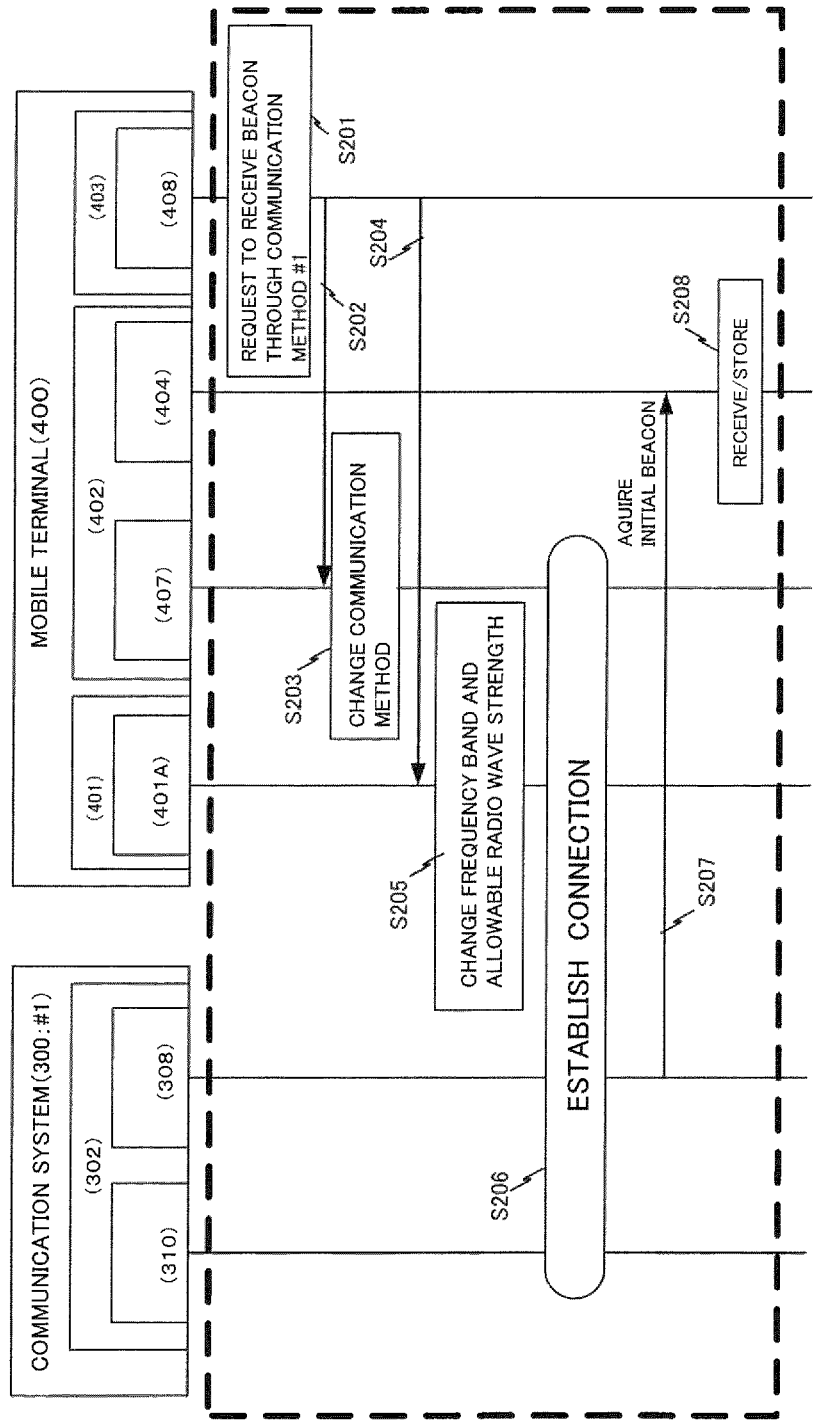
FIG. 33 is a sequence diagram illustrating an operational example related to initial beacon reception performed by the mobile terminal.

FIG. 33 is a sequence diagram illustrating an operational example of the procedures (1) to (3) related to the initial beacon reception. In FIG. 33, the request list generating unit 408 of the mobile terminal 400 generates a request to receive the initial beacon through the communication method #1 (S201), and then requests the data communication unit 407 to change the communication method to be used to the communication method #1 (S202). The data communication unit 407 changes the communication method to the communication method #1 in response to the request from the request list generating unit 408 (S203).

Further, the request list generating unit 408 requests the radio processing unit 401A to set the frequency band and the allowable radio wave strength according to the communication method #1 (S204). The radio processing unit 401A changes the settings of the frequency band and the allowable radio wave strength in response to the request (S205).

After that, a connection for communication is established between the data communication unit 407 and the data communication unit 310 of the communication system 300 (#1) (S206). Subsequently, the initial beacon is transmitted from the initial beacon transmitting unit 308 of the communication system 300 (#1) (S207). The initial beacon is received and stored by the initial beacon receiving unit 404 of the mobile terminal 400 (S208).

It should be noted that the above-mentioned procedures S201 to S208 are repeatedly executed for the other communication systems (methods) #2 to #n. With this, the mobile terminal 400 can receive the initial beacons corresponding to the communication systems (methods) #1 to #n.

<Operation 2: Recognition of Surrounding Radio Wave Condition and Prioritization>

The mobile terminal 400 observes the surrounding radio wave condition by itself. Based on the radio wave strengths of received radio waves, priorities to be used in selecting the communication method/frequency band is provided to the respective communication systems 300 (#1 to #n).

Here, in the case of the method A in which the network side collects and manages the information necessary for the recognition of the frequency band in an integrated manner, and the terminal performs the recognition by using that information, which is different from the method B in which the terminal itself collects the information, the operation 2 is not performed (FIG. 31). To give more details, the following procedures (1) and (2) are performed.

(Procedure (1))

The radio processing unit 401A of the mobile terminal 400 measures the radio wave conditions around the mobile terminal 400, which correspond to the respective communication methods #1 to #n. The radio wave conditions are listed by the communication method/frequency band determining unit 409 of the mobile terminal 400. In other words, a radio wave condition list is generated.

Figure 34:
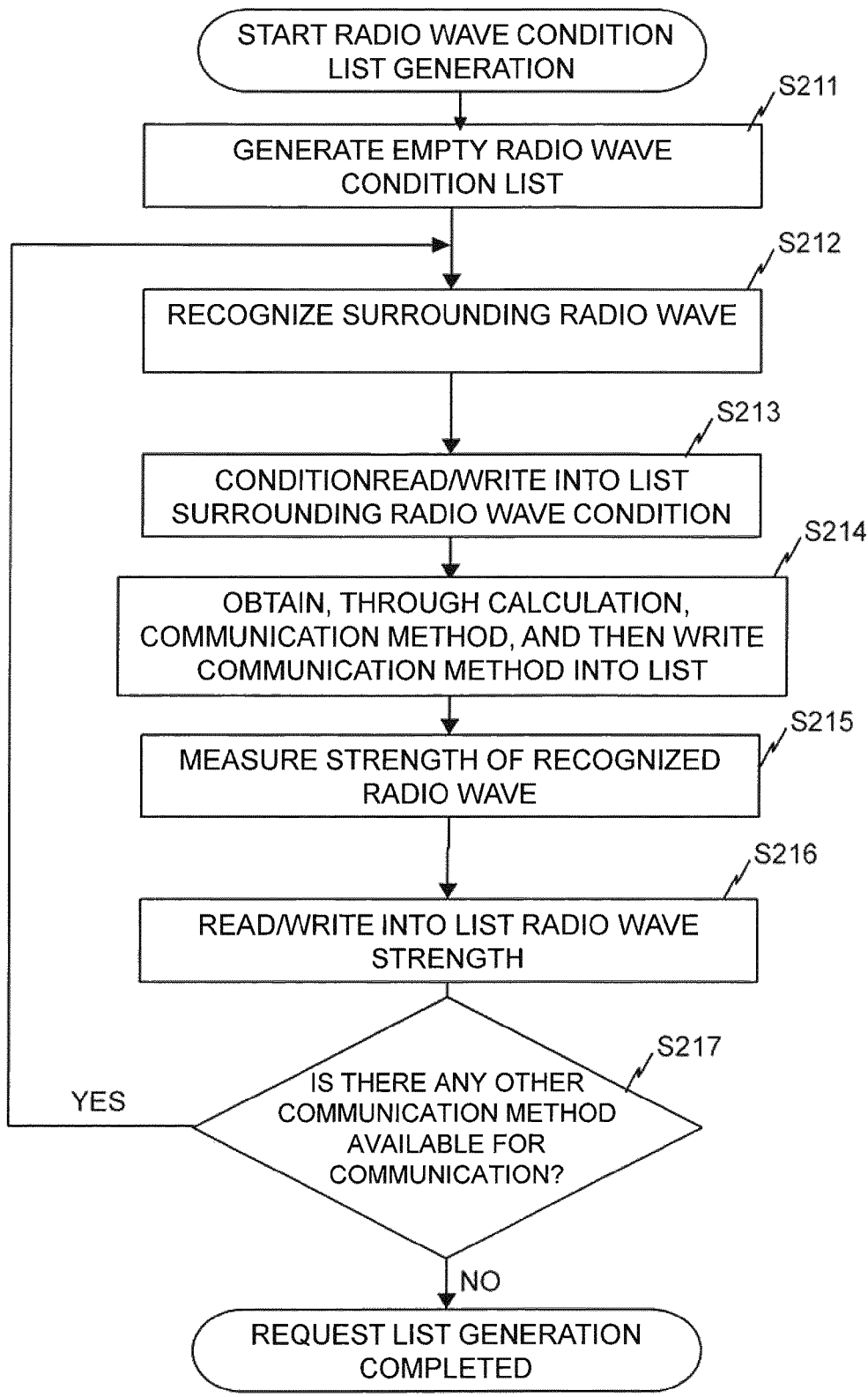
FIG. 34 is a flow chart illustrating a procedural example of radio wave condition list generation that is carried out by a communication method/frequency band determining unit.

FIG. 34 is a flow chart illustrating a procedural example of radio wave condition list generation that is carried out by the communication method/frequency band determining unit 409. The radio wave condition list is generated through Steps S211 to S217 described below.

<Step S211> The communication method/frequency band determining unit 409 generates an empty radio wave condition list.

<Step S212> The radio processing unit 401A transmits the recognized frequency band to the communication method/frequency band determining unit 409. The recognition of the frequency band is performed by the radio processing unit 401A receiving and measuring the radio wave.

<Step S213> Next, the communication method/frequency band determining unit 409 writes the surrounding radio wave condition (frequency band) measured by the radio processing unit 401A into the radio wave condition list.

<Step S214> Next, the communication method/frequency band determining unit 409 obtains, through calculation, a communication method of the frequency band received by the radio processing unit 401A, and then writes the communication method into the radio wave condition list.

<Step S215> The radio processing unit 401A measures the radio wave strength of the recognized frequency band, and then transmits the radio wave strength to the communication method/frequency band determining unit 409.

<Step S216> The communication method/frequency band determining unit 409 writes the radio wave strength of the frequency band into the radio wave condition list.

<Step S217> The above-mentioned processing of Steps S211 to S216 is executed repeatedly for all the frequencies (communication methods available for communication) recognizable by the radio processing unit 401A.

FIG. 35 is a table illustrating a data format example of the radio wave condition list indicating the surrounding radio wave conditions listed by the communication method/frequency band determining unit 409. The radio wave condition list stores frequency bands and radio wave strengths with regard to the received (communicably available) communication methods.

(Procedure (2))

Based on the radio wave conditions stored in the communication method/frequency band determining unit 409, the priorities to be used in selecting the communication method/frequency bands are determined for the respective communication methods/frequency bands, and then written into a priority list.

Figure 36:
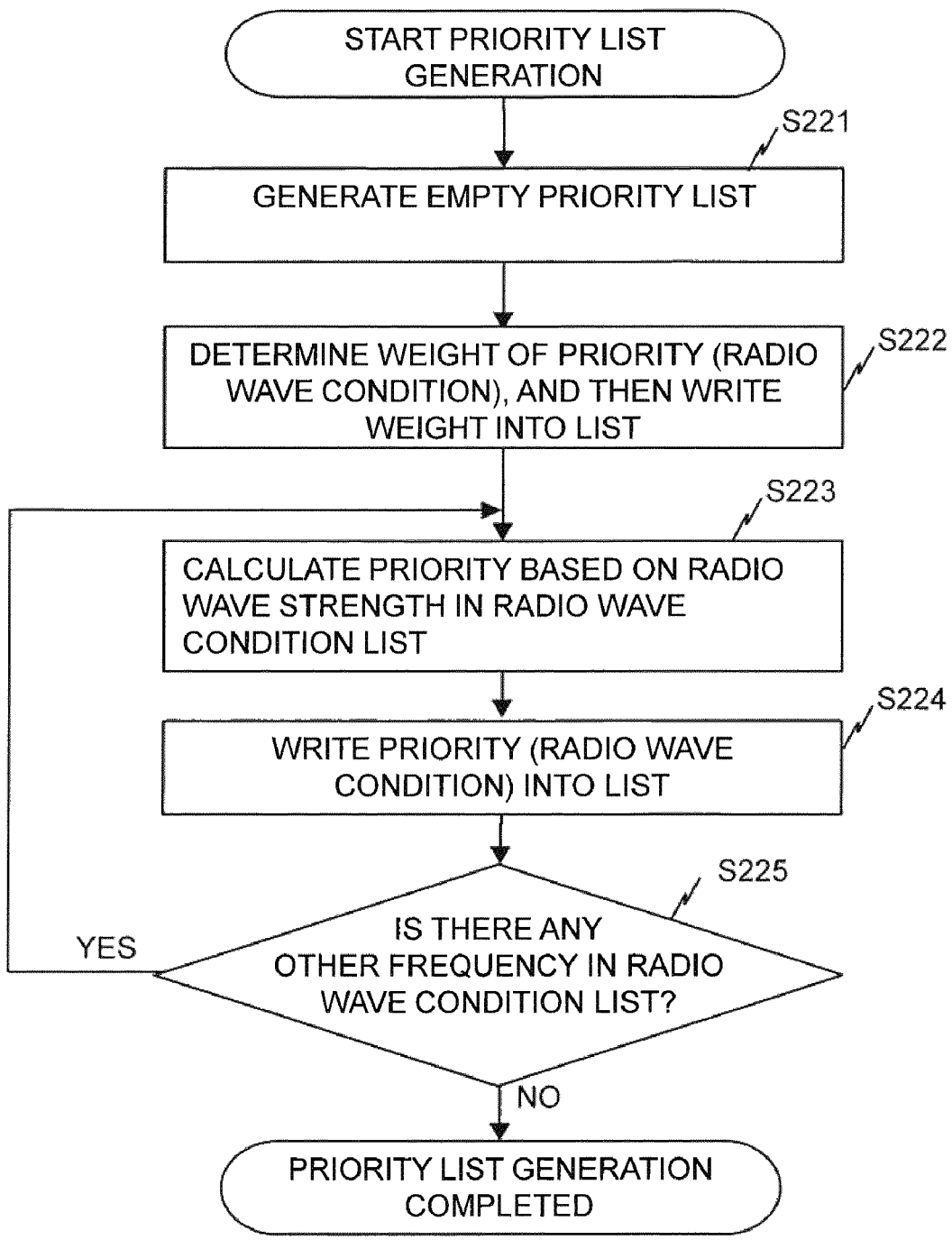
FIG. 36 is a flow chart illustrating an example of processing of generating a priority list containing priorities (radio wave conditions), which is performed by the communication method/frequency band determining unit.

FIG. 36 is a flow chart illustrating an example of processing of generating a priority list, which is performed by the communication method/frequency band determining unit 409. The priority list is generated through Steps S221 to S225 of FIG. 36 described below.

<Step S221> The communication method frequency band determining unit 409 generates an empty priority list.

<Step S222> Next, the communication method/frequency band determining unit 409 determines the weight of the priority (radio wave condition), and then writes the weight into the priority list.

<Step S223> Next, the communication method/frequency band determining unit 409 calculates the priority based on the radio wave strength in the radio wave condition list (an example of the calculation method is described later).

<Step S224> Next, the communication method/frequency band determining unit 409 writes the priority (radio wave condition) into the list.

<Step S225> The above-mentioned processing of Steps S223 and S224 is executed repeatedly for all the frequency bands in the radio wave condition list.

The priority is determined by using, for example, the following calculation expression.

(Priority (radio wave condition))=(radio wave strength (%))×0.1     <calculation expression>

It should be noted that the radio wave strength (%) is obtained by using the ratios with respect to a maximum strength and a minimum strength of each communication method. For example, when the communication method #1 has a maximum strength of "X1 dBm" and a minimum strength of "X2 dBm", and the measured radio wave strength is "X3 dBm", the radio wave strength is calculated as follows. Specifically, when the minimum strength is assumed to be 0, the maximum strength is X1−X2 and the measured strength is X3−X2. Accordingly, the following holds: (radio wave strength (%))=100×(X3−X2/X1−X2).

FIG. 37 illustrates a data format example of the priority list. In the example illustrated in FIG. 37, there are indicated the priorities for the communication methods #1 to #3 in a case where it is assumed that the mobile terminal 400 can use the communication methods #1 to #3. It should be noted that the example illustrated in FIG. 37 shows a case in which the mobile terminal 400 has not carried out the recognition (radio wave reception) of the communication method #3. In this case, the priority (radio wave condition) of the communication method #3 is assigned with no value.

<Operation 3: Generation and Transmission of Request List for Making a Request to Cognitive Information Management unit>

Based on the communication methods available for the mobile terminal 400, and the status (terminal status) and user action contents of the mobile terminal, the request list generating unit 408 lists parameters necessary in selecting the communication method/frequencies, and then transmits a request list for those parameters to the cognitive information management unit 200. Details include the following procedures (1) and (2).

(Procedure (1))

Based on the communication methods available for the mobile terminal 400, the terminal status, and the user action contents, the request list generating unit 408 generates parameters necessary in selecting the communication method/frequencies as a request list. Hereinafter, examples of the terminal status and the user action contents are described.

Figure 38:
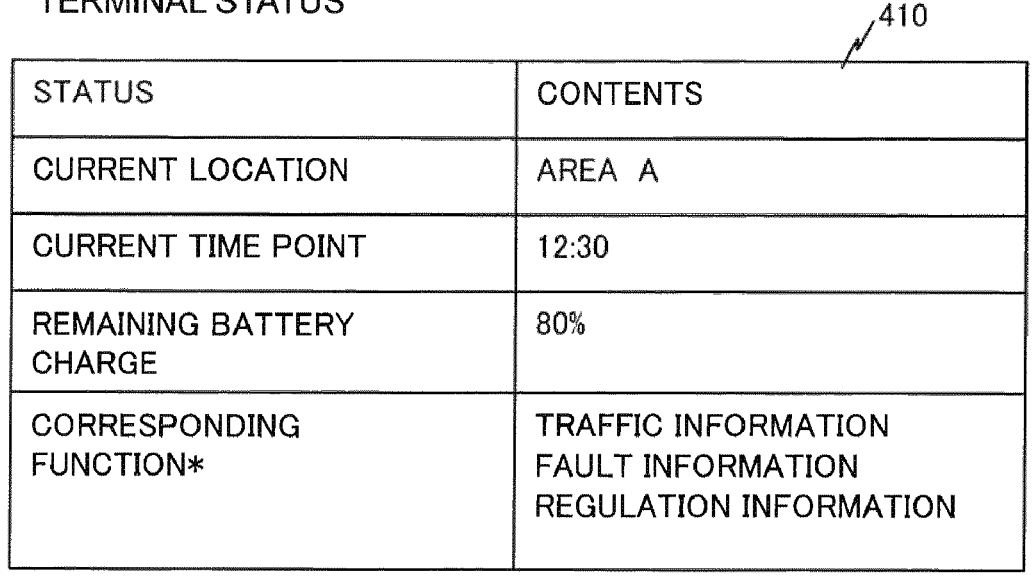
FIG. 38 is a table illustrating an example of a terminal status.

For example, description is given of a case in which a voice call is performed for an hour from a time point of 12:30 in the area A. FIG. 38 is a table illustrating an example of the terminal status.

In the example illustrated in FIG. 38, the terminal status contains a current location, a current time point, a remaining battery charge, and a corresponding function. The corresponding function indicates radio wave information that can be referred to in selecting the communication method/frequencies. Here, the corresponding function contains the traffic information, the fault information, and the regulation information.

Figure 39:
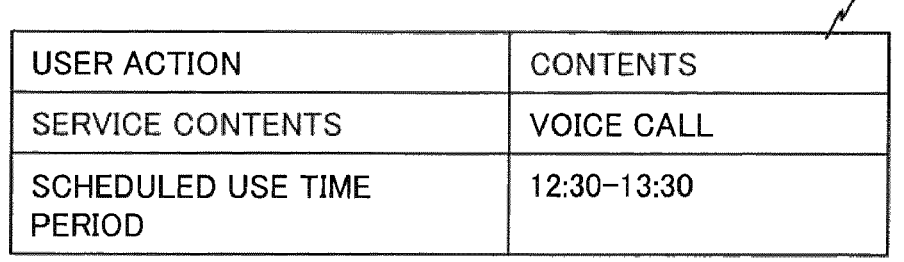
FIG. 39 is a table illustrating an example of user action contents.

FIG. 39 is a table illustrating an example of the user action contents. In the example illustrated in FIG. 39, as the user action contents, there are contained a service content and a scheduled use time period. The terminal status and the user action contents illustrated in FIG. 38 and FIG. 39 correspond to the terminal status 410 and the user action contents 411 illustrated in FIG. 5, respectively, and are collected by the request list generating unit 408 for generating a request list.

Figure 40:
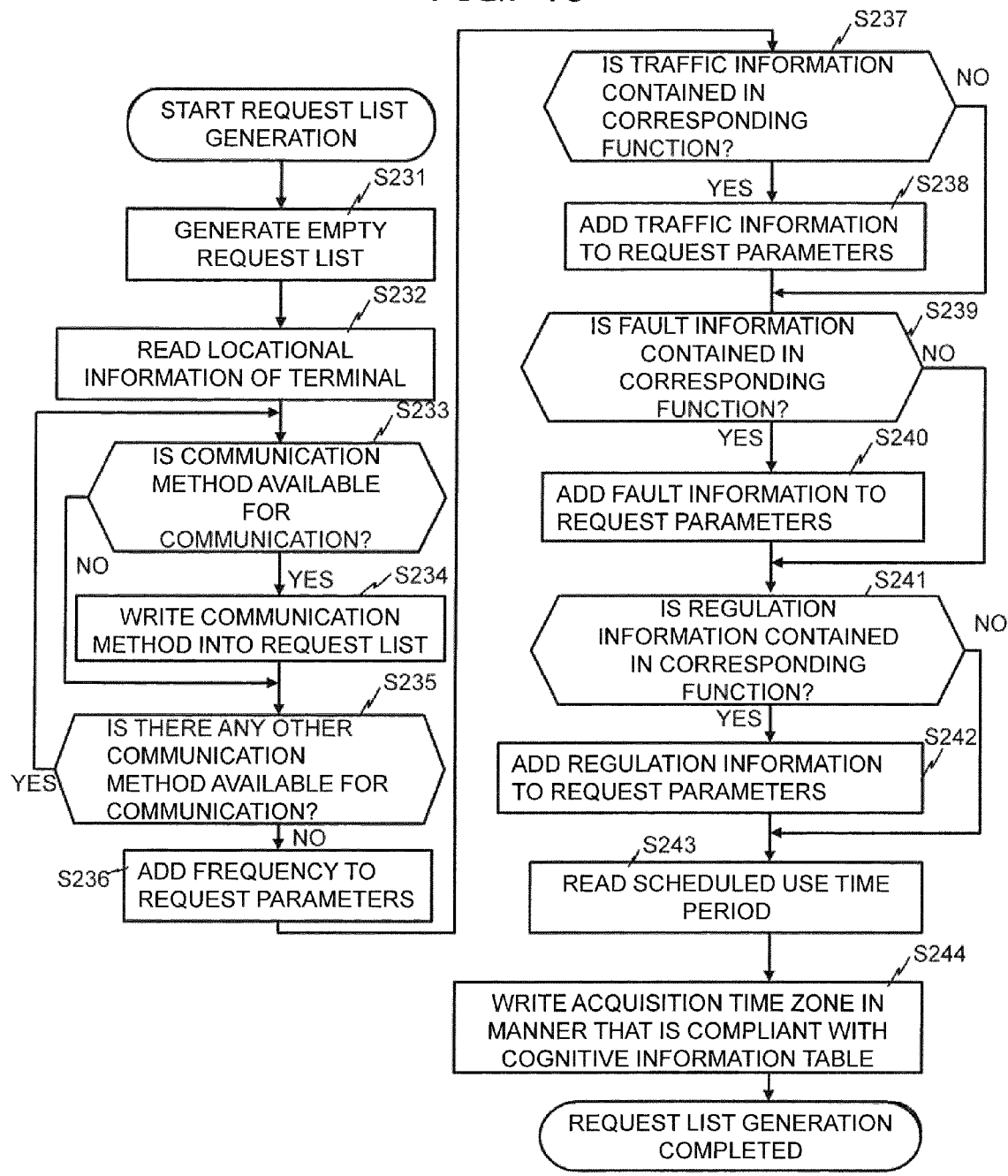
FIG. 40 is a flow chart illustrating an example of processing procedures of request list generation performed by a request list generating unit.

FIG. 40 is a flow chart illustrating an example of the processing procedures of the request list generation performed by the request list generating unit 408. The request list is generated through Steps S231 to S244 described below.

<Step S231> The request list generating unit 408 generates an empty request list.

<Step S232> Next, based on the terminal status 410 (FIG. 38), the request list generating unit 408 reads information on the current location of the mobile terminal 400.

<Steps S233, S234, and S235> Next, the request list generating unit 408 writes all the communication methods available for the mobile terminal 400 into the request list.

<Step S236> Next, the request list generating unit 408 adds the frequency to the request parameters in the request list.

<Steps S237 and S238> Next, the request list generating unit 408 refers to the terminal status 410, and, when the traffic information corresponds to the request parameters (the corresponding function of the terminal status 410 contains the traffic information), adds the traffic information to the corresponding function of the request list.

<Steps S239 and S240> Next, the request list generating unit 408 refers to the terminal status 410, and, when the fault information corresponds to the request parameters (the corresponding function of the terminal status 410 contains the fault information), adds the fault information to the corresponding function of the request list.

<Steps S241 and S242> Next, the request list generating unit 408 refers to the terminal status 410, and, when the regulation information corresponds to the request parameters (the corresponding function of the terminal status 410 contains the regulation information), adds the regulation information to the corresponding function of the request list.

<Step S243> Next, the request list generating unit 408 reads the scheduled use time period from the user action contents.

<Step S244> The request list generating unit 408 performs writing of the acquisition time zone in a manner that is compliant with the format of the cognitive information table 210 generated by the cognitive information management unit 200. For example, in a case where a time point is set on an hour basis in the cognitive information table 210, the request list generating unit 408 writes the acquisition time zone on an hour basis.

FIG. 41 illustrates a data format example of the request list that has been generated through the above-mentioned procedures. FIG. 41 illustrates a request list generated in a case where a voice call is performed for an hour from a time point of 12:30 in the area A. It should be noted that the terminal status is similar to that of the above.

(Procedure (2))

The generated request list is transmitted from the radio processing unit 401A, and then transmitted, via the communication method 300 that has transmitted the initial beacon, to the cognitive information management unit 200.

<Operation 4: Reception of Detailed List from Cognitive Information Management Unit, and Prioritization Based Thereon>

The detailed list receiving unit 405 (FIG. 5) receives the detailed list transmitted from the cognitive information management unit 200 in response to the request list transmitted to the cognitive information management unit 200 in the operation 3, and then transmits the detailed list to the communication method/frequency band determining unit 409. Based on the parameters within the received detailed list, the communication method/frequency band determining unit 409 determines the priorities to be used in selecting the communication method/frequencies for the respective communication methods/respective frequency bands. To give more details, the following procedures (1) and (2) are performed.

(Procedure (1))

The detailed list receiving unit 405 receives, via the radio processing unit 401A, the detailed list corresponding to the request list from the cognitive information management unit 200, and then transmits the detailed list to the communication method/frequency band determining unit 409. FIG. 42 illustrates an example of the received detailed list.

(Procedure (2))

Based on the parameters in the received detailed list, the terminal status 410, and the user action contents 411, the communication method/frequency band determining unit 409 determines the priorities to be used in selecting the communication method/frequency band for the respective communication methods/respective frequency bands, and then writes the priorities into the priority list.

Figure 43:
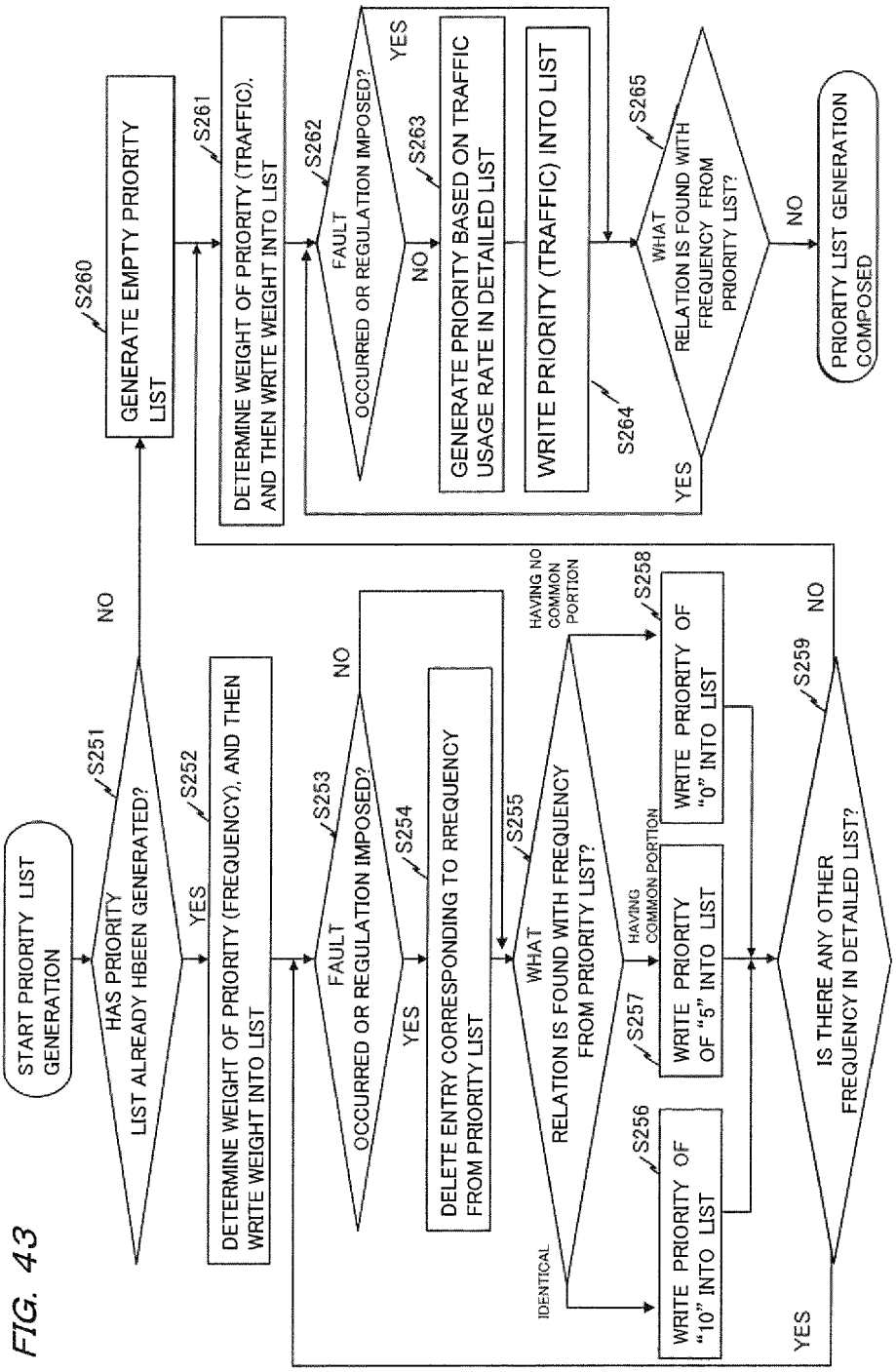
FIG. 43 is a flow chart illustrating an example of procedures of generating the priority list (processing of determining priorities (frequency and traffic)), which are executed by the communication method/frequency band determining unit.

FIG. 43 is a flow chart illustrating an example of procedures of generating the priority list, which are executed by the communication method/frequency band determining unit 409 in this procedure (2). The generation procedures are as follows.

<Step S251> The communication method/frequency band determining unit 409 checks whether or not a priority list has already been generated. In a case where a priority list has been generated (YES of S251), the processing proceeds to Step S252, whereas in a case where a priority list has not been generated (NO of S251), the processing proceeds to Step S260.

It should be noted that apriority list already exists only when the mobile terminal 400 has recognized the surrounding radio wave condition, that is, in a case where the operation 2 has already been executed (in the case where the method B is executed).

<Step S252> The communication method/frequency band determining unit 409 determines the weight of the priority (frequencies), and then writes the weight into the priority list.

<Steps S253 and S254> When the priority list contains any frequencies whose fault information is "fault occurred" or whose regulation information is "regulation imposed" in the detailed list, the communication method/frequency band determining unit 409 deletes an entry corresponding to those frequencies from the priority list.

<Step S255> Next, the communication method/frequency band determining unit 409 makes comparison between one of the frequency bands of the detailed list (FIG. 42) and a frequency band of the radio wave condition list (FIG. 35) to thereby judge whether the frequency bands are identical, have a common portion, or have no common portion.

<Step S256> When one frequency band of the detailed list is the same as the frequency band of the radio wave condition list, that is, the same as the frequency band recognized by the mobile terminal 400, the communication method/frequency band determining unit 409 writes a priority of "10" into the priority list.

<Step S257> When one frequency band of the detailed list has a common portion to the frequency band recognized by the mobile terminal 400, the communication method/frequency band determining unit 409 writes a priority of "5" into the priority list.

<Step S258> When one frequency band of the detailed list has no common portion to the frequency band recognized by the mobile terminal 400, the communication method/frequency band determining unit 409 writes a priority of "0" into the priority list.

<Step S259> When there are other frequency bands in the detailed list, the communication method/frequency band determining unit 409 repeatedly executes the operation of Steps S253 to S258 for all the other frequency bands. It should be noted that the operation from Steps S255 to S258 is not performed for a frequency band whose fault information is "fault occurred" or whose regulation information is "regulation imposed" (NO of Step S253). After the processing is finished for all the frequency bands in the detailed list, the communication method/frequency band determining unit 409 advances the processing to Step S261.

<Step S260> Because there is no priority list generated, the communication method/frequency band determining unit 409 generates an empty priority list.

<Step S261> Next, the communication method/frequency band determining unit 409 determines the weight of the priority (traffic).

<Steps S263 and S264> Next, the communication method/frequency band determining unit 409 calculates the priority (traffic) from the traffic usage rate of the detailed list, and then writes the priority into the priority list.

<Step S265> When there are other frequency bands in the detailed list, the processing of Steps S263 and S264 is repeatedly performed for all the other frequency bands. It should be noted that the communication method/frequency band determining unit 409 does not perform the operation of Steps S263 and S264 for a frequency band whose fault information is "fault occurred" or whose regulation information is "regulation imposed" (Step S262).

The calculation of the priority (traffic) of Step S263 is performed according to, for example, the following calculation expression.

(Priority (traffic))=(100− (traffic usage rate (%)))×0.1   <calculation expression>

FIG. 44 is a table illustrating a data format example of the priority list generated through the processing illustrated in FIG. 43. It should be noted that, in the case of the method A in which the mobile terminal 400 employs a processing method of not recognizing the surrounding radio wave condition, the priority of the radio wave condition is left empty. Further, with regard to the communication method (communication method #3 of FIG. 42) for which the mobile terminal 400 itself does not perform the recognition, the priorities (radio wave condition and frequencies) are assigned with no value.

<Operation 5: Prioritization Based on Terminal Status and User Action Contents>

Based on the terminal status 410 and the user action contents 411, the communication method/frequency band determining unit 409 can determine the priorities to be used in selecting the communication method/frequencies. Detailed procedures are described in the following (1) and (2).

(Procedure (1))

Based on the terminal status 410, the communication method/frequency band determining unit 409 determines the priorities to be used in selecting the communication method/frequencies, and then writes the priorities into the priority list. On this occasion, with regard to the terminal status (remaining battery charge), priorities of the communication methods, which are set in advance for the remaining battery charges, are used.

For example, with regard to the communication methods #1 and #2, the priorities are defined in advance as follows.

EXAMPLE 1

Communication Method #1

Priority (battery)=10: remaining charge of between 70% or more and 100% or less
Priority (battery)=5: remaining charge of between 40% or more and less than 70%
Priority (battery)=0: remaining charge of between 0% or more and less than 40%

EXAMPLE 2

Communication Method #2 (Example: A Communication Method having less Battery Consumption than the Communication Method #1)

Priority (battery)=0: remaining charge of between 70% or more and 100% or less
Priority (battery)=5: remaining charge of between 40% or more and less than 70%
Priority (battery)=10: remaining charge of between 0% or more and less than 40%

(Procedure (2))

Next, based on the user action contents 411, the communication method/frequency band determining unit 409 determines the priorities to be used in selecting the communication method/frequencies, and then writes the priorities into the priority list. With regard to the user action contents (service contents), priorities of the communication methods, which are defined in advance for service contents, are used. Examples of the priorities are as follows.

EXAMPLE 1

Communication Method #1 (Example: When a Long Time Service is Desired)

Priority (service)=10: available both at present and in the future (predicted value)
Priority (service)=0: unavailable in the future

EXAMPLE 2

Communication Method #2 (Example: A Communication Method Advantageous for Communication on the Move)

Figure 45:
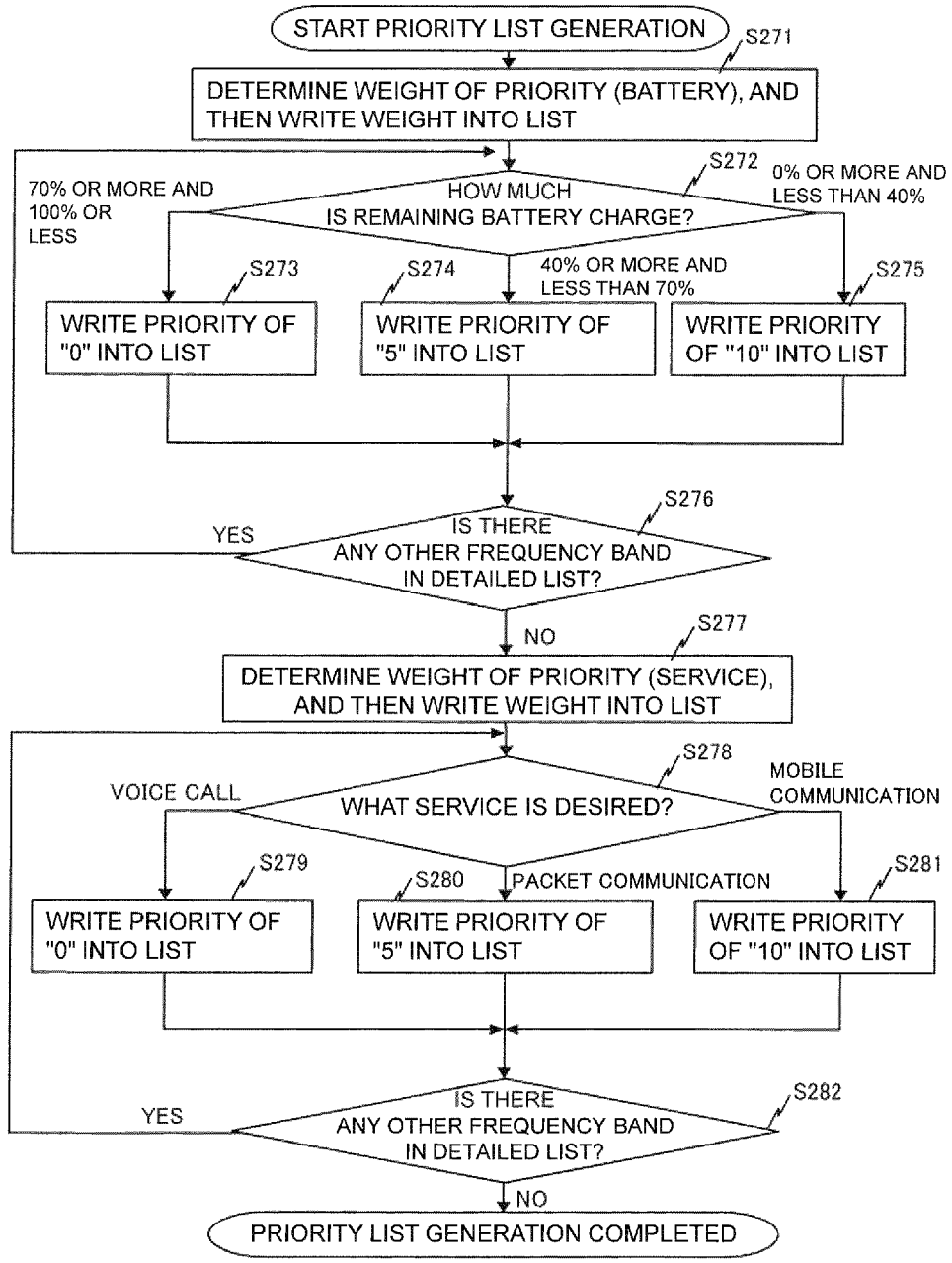
FIG. 45 is a flow chart illustrating a processing example of the priority list generation performed by the communication method/frequency band determining unit based on the terminal status and the user action contents (service contents)

Priority (service)=0: voice call
Priority (service)=5: packet communication
Priority (service)=10: mobile communication FIG. 45 is a flow chart illustrating a processing example of the priority list generation performed by the communication method/frequency band determining unit 409 based on the terminal status and the user action contents (service contents).

In the processing example illustrated in FIG. 45, a "method having less battery consumption" is employed with regard to the terminal status (remaining battery charge), and a "method advantageous for communication on the move" is employed with regard to the user action contents (service contents).

When the processing of FIG. 45 is started, the communication method/frequency band determining unit 409 performs processing of determining the weight of the priority (battery) and writing the weight into the list (Step S271). Specifically, the communication method/frequency band determining unit 409 checks the remaining battery charge contained in the terminal status 410 with respect to one of the frequency bands in the detailed list (Step S272).

On this occasion, when the remaining battery charge is between 70% or more and 100% or less, the communication method/frequency band determining unit 409 writes the priority of "0" into the priority list. (Step S273).

On the other hand, when the remaining battery charge is between 40% or more and less than 70%, the communication method/frequency band determining unit 409 writes the priority of "5" into the priority list. (Step S274).

On the other hand, when the remaining battery charge is between 0% or more and less than 40%, the communication method/frequency band determining unit 409 writes the priority of "10" into the priority list. (Step S275).

Next, when there are other frequency bands in the detailed list (radio wave condition list), the communication method/frequency band determining unit 409 performs the processing of Steps S272 to S275 for all the other frequency bands (Step S276).

After the writing processing of the priority (battery) is finished, the communication method/frequency band determining unit 409 performs processing of determining the weight of the priority (service) and writing the weight into the detailed list (Step S277). Specifically, with respect to one of the frequency bands in the detailed list, the communication method/frequency band determining unit 409 refers to the user action contents 411 to check what service content the user desires to receive (Step S278).

On this occasion, when the service content is the "voice call", the communication method/frequency band determining unit 409 writes the priority of "0" into the priority list (Step S279).

On the other hand, when the service content is the "packet communication", the communication method/frequency band determining unit 409 writes the priority of "5" into the priority list (Step S280).

On the other hand, when the service content is the "mobile communication", the communication method/frequency band determining unit 409 writes the priority of "10" into the priority list (Step S281).

Next, when there are other frequency bands in the detailed list (radio wave condition list), the communication method/frequency band determining unit 409 performs the processing of Steps S278 to S281 for all the other frequency bands (Step S282). After the writing of the priorities (service) is finished for all the frequency bands, the processing of the priority list generation is finished.

FIG. 46 is a table illustrating a data format example of the priority list that is generated through the operation 5 and contains the priorities set based on the remaining battery charges and the service contents.

<Operation 6: Determination of Communication Method/Frequency Band, and Changing of Communication Method>

Based on the priority list generated through the operations 1 to 5, the communication method/frequency band determining unit 409 determines the communication method/frequency band that are actually to be used for communication. The determined communication method/frequency band are transmitted to the communication method/frequency band changing unit 406.

Further, with regard to the change in communication method, the communication method/frequency band determining unit 409 notifies the data communication unit 407 of the change. After that, communication is performed with the determined communication method/frequency band. To give more details, the following procedures (1) to (3) are performed.

(Procedure (1))

Based on the priority list, the communication method/frequency band determining unit 409 determines the communication method/frequency band that is actually to be used for communication. FIG. 47 is a table illustrating a reference example (priority list) for determining the communication method/frequency band, which is used by the determining unit 409 in the processing of determining the communication method/frequency band.

Here, in the table of FIG. 47, a weight of "1" is set for all the priorities. It should be noted that the weight may be changed depending on what kind of priority is desired to be prioritized higher. In the contents of the priority list illustrated in FIG. 47, a communication method to be determined (selected) by the determining unit 409 is the "communication method #3", which has the largest weight.

(Procedure (2))

The determined communication method/frequency band is transmitted to the communication method/frequency band changing unit 406. According to an instruction from the communication method/frequency band changing unit 406, the radio processing unit 401A changes the frequency band and the allowable radio wave strength based on the determined contents.

(Procedure (3))

The determined communication method/frequency band is transmitted to the data communication unit 407 to change the communication method, and then a communication becomes ready to be started.

Figure 48:
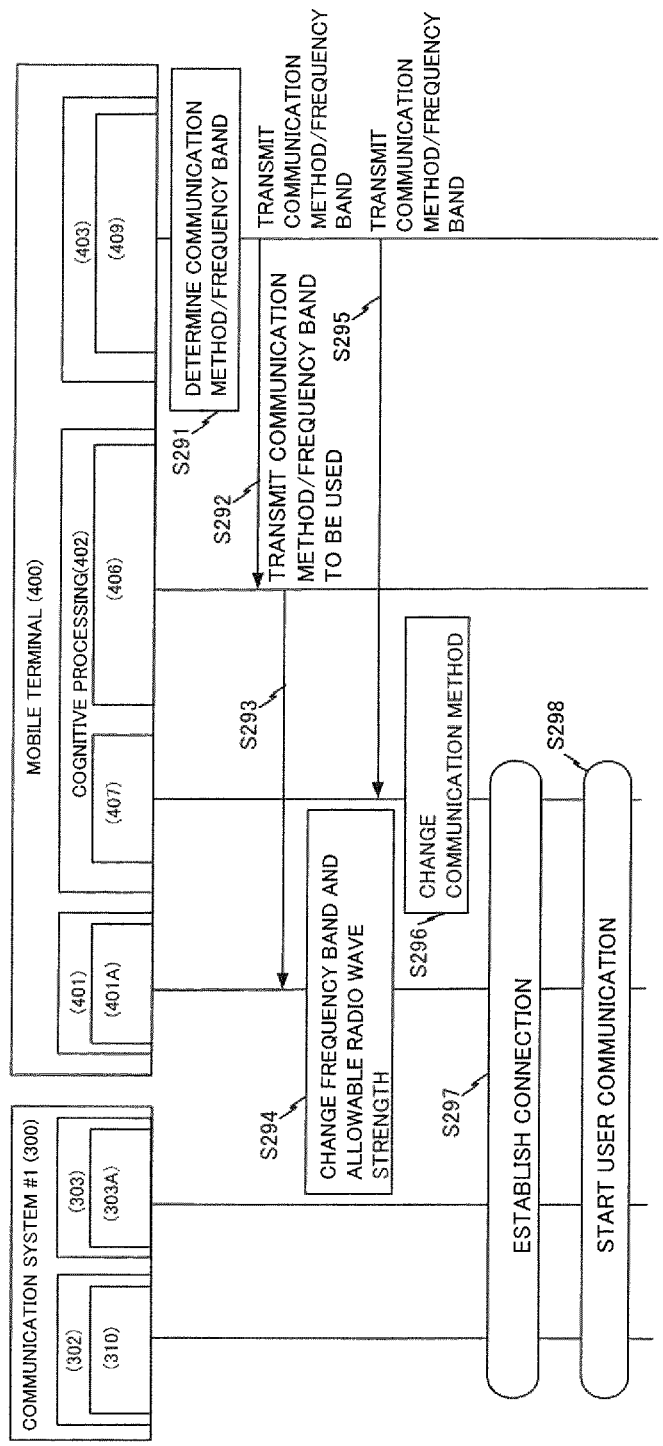
FIG. 48 is a sequence diagram illustrating an operational example related to an operation 6 of the mobile terminal.

FIG. 48 is a sequence diagram illustrating an operational example related to the operation 6. In FIG. 48, the communication method/frequency band determining unit 409 of the mobile terminal 400 determines the communication method/frequency band (Step S291), and then transmits the determined contents (communication method/frequency band) to the communication method/frequency band changing unit 406 (Step S292).

The communication method/frequency band changing unit 406 transmits, along with a change instruction based on the determined contents, the determined contents thus received to the radio processing unit 401A (Step S293). The radio processing unit 401A changes, in response to the change instruction, the frequency band to be used and the allowable radio wave strength based on the determined contents (Step S294).

Further, the communication method/frequency band determining unit 409 transmits the determined contents of the communication method/frequency band to the data communication unit 407 (Step S295). Based on the determined contents, the data communication unit 407 changes the communication method to be used by the mobile terminal 400 for communication (Step S296).

After that, a connection for communication is established between the changed communication method 300 (in this example, communication method #1) and the mobile terminal 400 (Step S297), and then, a user communication is started (Step S298).

<Flow of Actual Operation>

Next, description is given of an operational example of an actual operation of the mobile terminal 400. The basic operation has been described in the operations 1 to 6. Hereinafter, there is described a flow of a case in which the mobile terminal 400 receives a long time service continuously.

Figure 49:
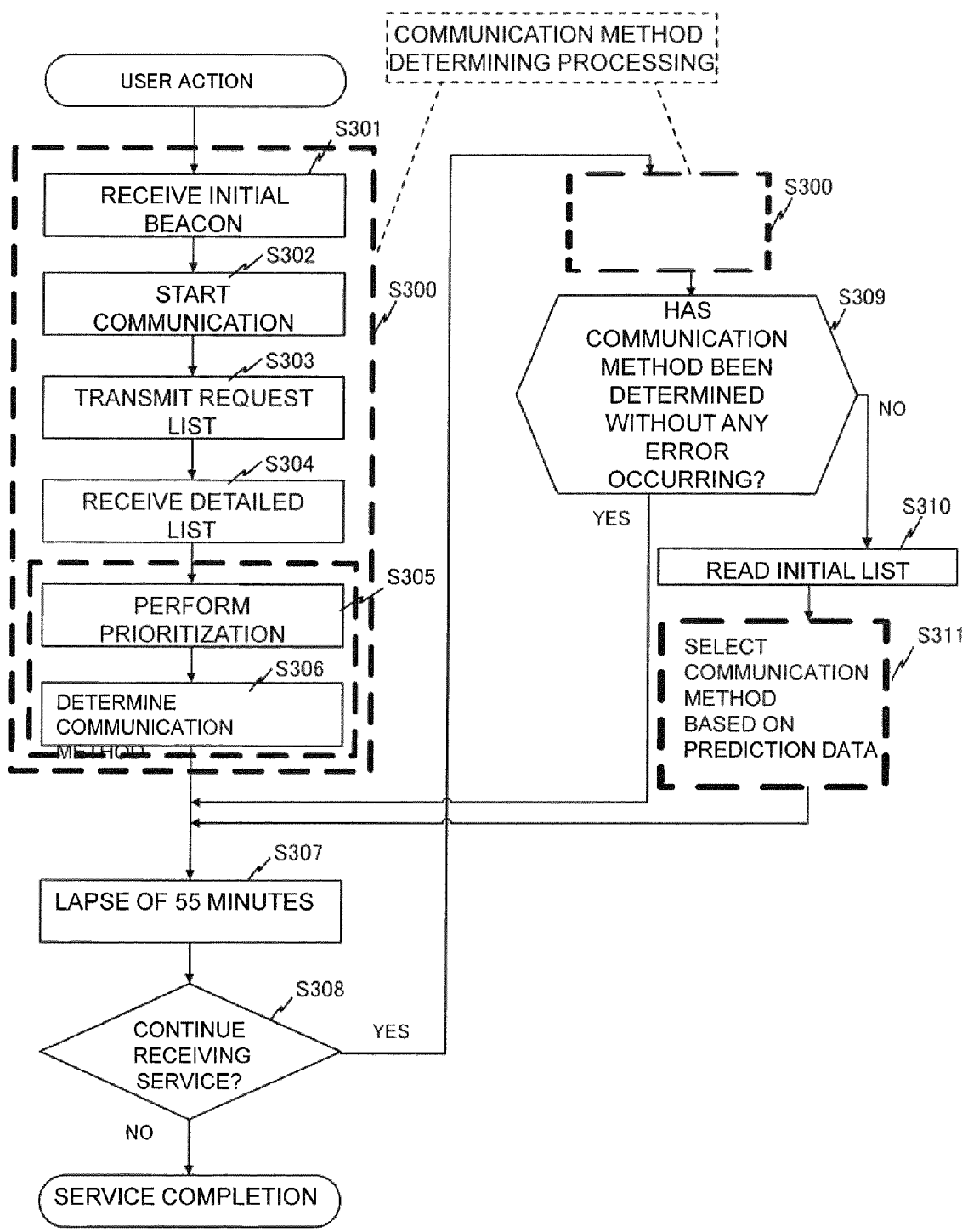
FIG. 49 is a flow chart illustrating a processing example of a case in which the mobile terminal receives a service continuously.

FIG. 49 is a flow chart illustrating a processing example of a case in which the mobile terminal receives a service continuously. In FIG. 49, the mobile terminal 400 performs communication method determining processing (Step S300: operations 1 to 6) including Steps S301 to S306.

In the communication method determining processing (S300), the mobile terminal 400 receives the initial beacon from a given communication method 300 (Step S301: operation 1), and then starts communication with the communication method 300 (Step S302: operation 2).

Next, the mobile terminal 400 transmits the request list toward the cognitive information management unit 200 (Step S303: operation 3), and then receives, via the communication method 300, the detailed list from the cognitive information management unit 200 (Step S304: operation 4).

Next, based on the detailed list, the mobile terminal 400 performs the prioritization (priority setting) for the communication methods available for the mobile terminal 400 (generation of priority list: Step S305: operation 5), and then determines the communication method/frequency band based on the priority list (Step S306: operation 6). In this manner, a communication is started with the determined communication method and frequency band.

After that, when a predetermined period of time (for example, 55 minutes) has elapsed after starting the communication (Step S307), the mobile terminal 400 makes a query to the user as to whether or not to continue to receive the service. For example, the mobile terminal 400 displays the query to the display device. On this occasion, in a case where the user does not desire to continue the service (S308: NO), the service is finished when a unit for providing the service (in this example, one hour) is finished. Alternatively, the service may be finished immediately.

On the other hand, in a case where the user desires to continue the service (S308: YES), the mobile terminal 400 performs the communication method determining processing again (Step S300).

After that, in a case where the communication method has been determined without any error occurring (S309: YES), the mobile terminal 400 continues, for a predetermined period of time, a communication service that uses the newly-determined communication method (the processing proceeds to Step S307).

On the other hand, in a case where an error has occurred in the communication method determining processing (S309: NO), the initial list (data that has been used thus far for determining the communication method) is read again (Step S310), and then, the communication method is determined (selected) based on the prediction data in the detailed list (Step S311).

As described above, after a communication is started by using the communication method determined in the communication method determining processing, when there is a predetermined period of time (approximately five minutes) left before the unit for providing the service (one hour) elapses, the communication method determining processing is performed again if the user continuously receives the service that uses that communication method.

In a case where no error has occurred in the communication method determining processing performed again, provision of the service can be continued with the communication method that has been newly selected in that determining processing. On the other hand, in a case where an error has occurred, the information that has been used thus far is read again, and then, a communication method is selected based on the prediction data.

[Effects]

With the mobile terminal 400 according to the embodiment, after the initial beacon is received to start a communication, the detailed list corresponding to the request list is received from the cognitive information management unit 200, and, based on the contents of the detailed list, it is possible to perform the communication (receive the service) with an optimal communication method and an optimal frequency band.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A mobile terminal that performs wireless communication with one of a plurality of communication systems by using one of a plurality of communication methods, the one of the plurality of communication systems controlling the one of the plurality of communication methods, the mobile terminal comprising:

a reception unit to receive, from at least one of the plurality of communication systems, an initial beacon containing information for establishing communication according to each of the plurality of communication methods, the plurality of communication systems each controlling a corresponding one of the plurality of communication methods;

a request unit to use the information contained in the initial beacon to perform the communication with the at least one of the plurality of communication systems, to generate a provision request for information for determining a communication method and a frequency band, which are to be used in a time period by the mobile terminal, and to transmit the provision request to the at least one of the plurality of communication systems; and a determination unit to receive information provided by the at least one of the plurality of communication systems in response to the provision request and to determine the communication method and the frequency band, which are to be used in the time period by the mobile terminal, based on the information provided and received from the at least one of the plurality of communication systems, wherein the provided information contains, with regard to each communication method available for the mobile terminal, at least one of a measured value and a predicted value of each of usable frequency band information and operations, administration, and maintenance (OAM) information for the time period.

2. The mobile terminal according to claim 1, further comprising an acquisition unit to acquire information indicating a surrounding radio wave condition of the mobile terminal, wherein the determination unit determines the communication method and the frequency band, which are to be used, based on the information indicating the surrounding radio wave condition.

3. The mobile terminal according to claim 1, further comprising an acquisition unit to acquire at least one of terminal status information containing a remaining battery charge of the mobile terminal and user action information containing a service content desired by a user of the mobile terminal and a scheduled use time period, wherein the determination unit determines the communication method and the frequency band, which are to be used, based on the at least one of the terminal status information and the user action information, which are acquired by the acquisition unit.

4. The mobile terminal according to claim 1, further comprising a change unit to change the frequency band and an allowable radio wave strength, which are to be used for the wireless communication by the mobile terminal, according to the communication method and the frequency band, which are determined by the determination unit.

5. A method of determining a communication method and a frequency band, which is used for a mobile terminal that performs wireless communication with one of a plurality of communication systems by using one of a plurality of communication methods, the one of the plurality of communication systems controlling the one of the plurality of communication methods, the method comprising:

receiving, from at least one of the plurality of communication systems, an initial beacon containing information for establishing communication according to each of the plurality of communication methods, the plurality of communication systems each controlling a corresponding one of the plurality of communication methods;

using the information contained in the initial beacon to perform the communication with the at least one of the plurality of communication systems, generating a provision request for information for determining a communication method and a frequency band, which are to be used in a time period by the mobile terminal, and transmitting the provision request to the at least one of the plurality of communication systems;

receiving information provided by the at least one of the plurality of communication systems in response to the provision request; and determining the communication method and the frequency band, which are to be used in the time period by the mobile terminal, based on the information provided and received from the at least one of the plurality of communication systems, wherein the provided information contains, with regard to each communication method available for the mobile terminal, at least one of a measured value and a predicted value of each of usable frequency band information and operations, administration, and maintenance (OAM) information for the time period.

6. A computer readable medium for storing a program executed by a mobile terminal that performs wireless communication with one of a plurality of communication systems by using one of a plurality of communication methods, the one of the plurality of communication systems controlling the one of the plurality of communication methods, the program causing the mobile terminal to execute:

receiving, from at least one of the plurality of communication systems, an initial beacon containing information for establishing communication according to each of the plurality of communication methods, the plurality of communication systems each controlling a corresponding one of the plurality of communication methods;

using the information contained in the initial beacon to perform the communication with the at least one of the plurality of communication systems, generating a provision request for information for determining a communication method and a frequency band, which are to be used in a time period by the mobile terminal, and transmitting the provision request to the at least one of the plurality of communication systems;

receiving information provided by the at least one of the plurality of communication systems in response to the provision request; and determining the communication method and the frequency band, which are to be used in the time period by the mobile terminal, based on the information provided and received from the at least one of the plurality of communication systems, wherein the provided information contains, with regard to each communication method available for the mobile terminal, at least one of a measured value and a predicted value of each of usable frequency band information and operations, administration, and maintenance (OAM) information for the time period.

* * * * *